US011373460B2

(12) United States Patent
Badri et al.

(10) Patent No.: US 11,373,460 B2
(45) Date of Patent: Jun. 28, 2022

(54) REMOTE ASSET DETECTION SYSTEM

(71) Applicant: Cox Communications, Inc., Atlanta, GA (US)

(72) Inventors: Assar Badri, Scottsdale, AZ (US); Mitchel Kelley, Gilbert, AZ (US); Almedin Kozlica, Phoenix, AZ (US); Barak Weinisman, Sandy Springs, GA (US)

(73) Assignee: Cox Communications, Inc., Atlanta, GA (US)

( * ) Notice: Subject to any disclaimer, the term of this patent is extended or adjusted under 35 U.S.C. 154(b) by 348 days.

(21) Appl. No.: 16/113,566

(22) Filed: Aug. 27, 2018

(65) Prior Publication Data

US 2019/0066404 A1 Feb. 28, 2019

Related U.S. Application Data

(60) Provisional application No. 62/551,196, filed on Aug. 28, 2017.

(51) Int. Cl.

| | |
|---|---|
| ***G07C 5/00*** | (2006.01) |
| ***G06Q 30/00*** | (2012.01) |
| ***G06Q 10/08*** | (2012.01) |
| ***G07C 5/08*** | (2006.01) |
| ***G08G 1/00*** | (2006.01) |

(52) U.S. Cl.

CPC ........... *G07C 5/008* (2013.01); *G06Q 10/087* (2013.01); *G06Q 30/0185* (2013.01); *G07C 5/08* (2013.01); *G07C 2205/02* (2013.01); *G08G 1/20* (2013.01)

(58) Field of Classification Search

CPC ...... G07C 5/008; G07C 5/08; G07C 2205/02; G06Q 10/087; G06Q 30/0185

See application file for complete search history.

(56) References Cited

U.S. PATENT DOCUMENTS

| | | | | |
|---|---|---|---|---|
| 7,553,173 | B2 * | 6/2009 | Kowalick | H01R 13/443 439/133 |
| 9,208,627 | B2 * | 12/2015 | Bertosa | G07C 5/0808 |
| 9,384,599 | B2 * | 7/2016 | Chen | G07C 5/0808 |
| 9,761,066 | B2 * | 9/2017 | Chen | G01R 31/343 |
| 10,102,690 | B2 * | 10/2018 | Bell | F02D 41/22 |
| 10,322,728 | B1 * | 6/2019 | Porikli | G06K 9/6288 |
| 2004/0204816 | A1 * | 10/2004 | Dery | B60R 25/1003 701/113 |
| 2008/0015748 | A1 * | 1/2008 | Nagy | G07C 5/008 701/31.4 |
| 2009/0203247 | A1 * | 8/2009 | Fifelski | H01R 13/6273 439/345 |
| 2014/0067488 | A1 * | 3/2014 | James | G06Q 30/02 705/13 |
| 2014/0294180 | A1 * | 10/2014 | Link, II | H04W 12/06 380/270 |

* cited by examiner

*Primary Examiner* — Thomas Ingram
*Assistant Examiner* — Omar K Morsy
(74) *Attorney, Agent, or Firm* — Eversheds Sutherland (US) LLP

(57) ABSTRACT

Systems and methods for remote asset verification are disclosed. The systems and methods comprise an asset and an on-board diagnostic tool configured to be coupled to an on-board diagnostic port of the asset. The on-board diagnostic tool is configured to monitor one or more parameters of the asset.

20 Claims, 22 Drawing Sheets

300 305 302 307 304 309 309 309 309 306 311 308

REMOTE ASSET DETECTION SYSTEM

CROSS-REFERENCE TO RELATED APPLICATIONS

The disclosure claims priority to and the benefit of U.S. provisional application No. 62/551,196, filed Aug. 28, 2017, which is incorporated by reference herein in its entirety.

FIELD

The disclosure is related to asset management, and more particularly related to systems and methods comprising an on-board diagnostic tool for remote asset detection and management.

BACKGROUND

Collateral verification or floor plan audits are manual processes where a person makes a visit in-person at the location of the asset to verify that the asset is at the location. An individual may audit the inventory at the location. The inventory audits are often completed within a predetermined window of time (e.g., every three months). In some instances, the individual may randomly conduct the audit within the window of time. The audits may be completed to manually verify that the assets, such as vehicles, are at the location. However, such a process may be prone to human error as well as fraud. Additionally, such a manual audit may result in a negative client experience for personnel who are responsible for maintaining the assets at the location, because the verification process may be invasive and may imply a lack of trust.

Figure 1:
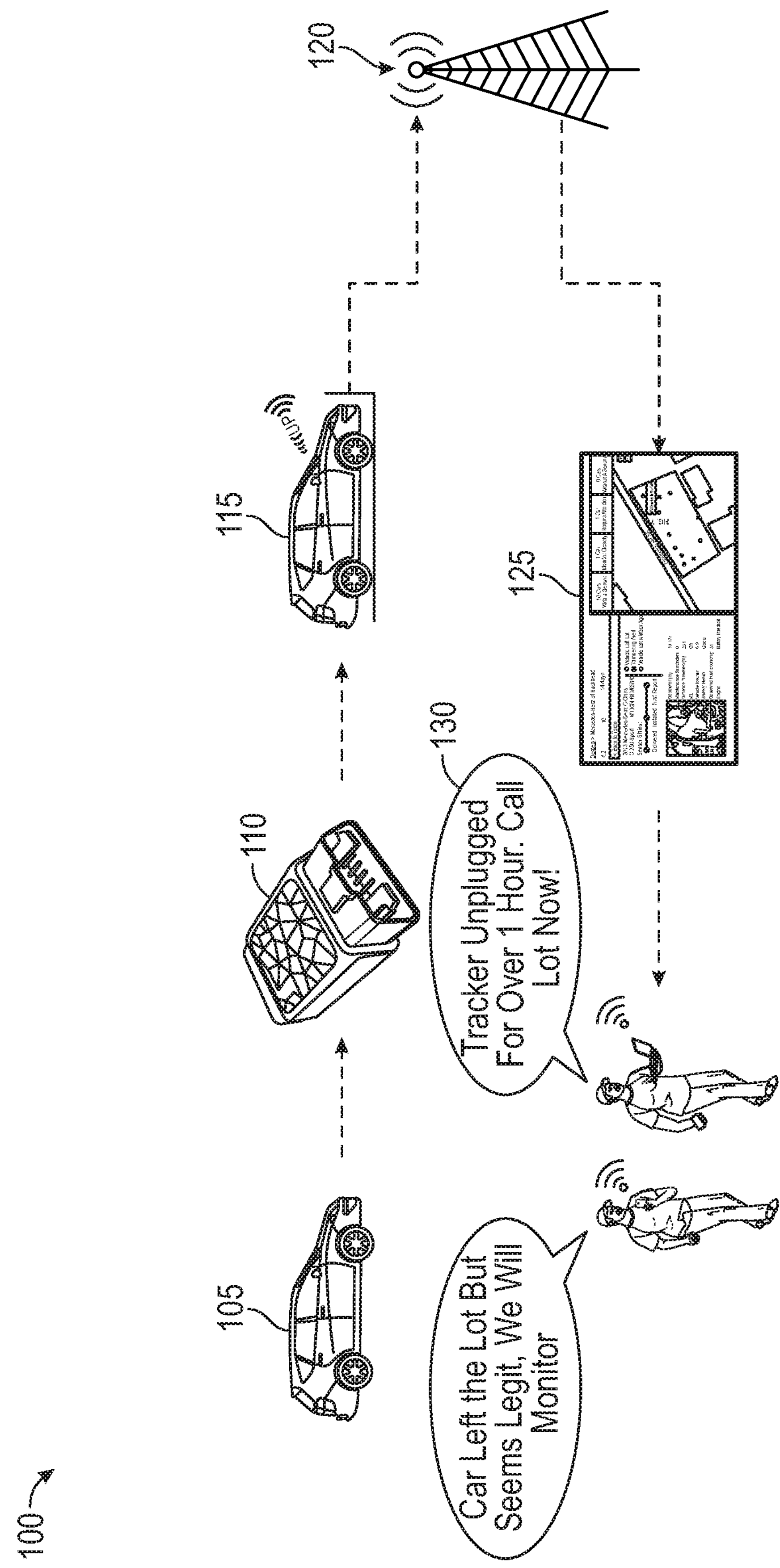
FIG. 1 is an example diagram for a use case for a remote asset detection system in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for remote asset detection. For example, asset verification or floor plan audits for vehicles are manual processes, where a representative may visit each location, such as a vehicle lot, once within a predetermined time window (e.g., every forty days) to manually verify that the cars are on the lot. Fraud costs resulting from error-prone human processes may result in millions of dollars of loss each year. Additionally, individuals responsible for maintaining the cars on the lots may have negative client experiences because the verification process may be invasive and may imply a lack of trust. The systems and methods described herein aim to digitize the floor plan audit process to improve risk management and customer experience.

In some embodiments, the systems and methods described herein may provide remote and continuous asset verification without having to physically send anyone to the lot while obtaining an accurate real-time read of a car's vehicle identification number (VIN) and location. A rules-based alert system may notify an administrator when to intervene (e.g., when an on-board diagnostic tool is unplugged from the vehicle) and when to monitor an asset more closely without wasting resources or bothering the personnel responsible for the car (e.g., a car left the lot but headed to a typical location for that lot).

The remote asset detection system may include a robust system interface and dashboards showing information to different users of the system, the use of on-board diagnostic (OBD) tools, and data analysis which may provide insight into a vehicle dealer's complete portfolio, dealership lot sale analytics (e.g., car trend report), dealership risk score based on OBD driving and routing data of the vehicles of the dealership, and the like. The OBD tool may include tamper-proof hardware, a backup battery, a GPS, an antenna, an accelerometer, and/or a pass-through port. In some embodiments, the OBD tool may be a tool that locks into an OBD port of a vehicle. The OBD tool may lock into the OBD port and prevent any other mechanism or tool to access the OBD port of the vehicle. The mechanical locking mechanism of the OBD tool may prevent the OBD tool from being removed from the OBD port of the vehicle. In some embodiments, the OBD tool may be a tool that may be inserted into the OBD port of the vehicle and may include a pass-through port. The pass-through port may allow personnel to connect their own OBD readers while permitting an administrator of the system to limit access to certain types of data. The OBD tool may also be equipped with one or more mechanical locking mechanisms that prevent the removal of the OBD tool from the OBD port of the vehicle.

In some embodiments, the backup battery may enable the OBD tool to function even if it is not connected to a vehicle. This enables the OBD tool to send signals to the remote asset detection system indicating that the tool has been disconnected or tampered with. The OBD tool may send periodic or heartbeat messages, which may indicate a location of the tool.

In some embodiments, the OBD tools, which may also be referred to as OBD trackers, may be installed on multiple vehicles. Data collected and generated by the OBD tools may be transmitted to a platform of the remote asset detection system. In some embodiments, the car data may be shared with the dealership, such as through access to a dealership application. In some embodiments, data may be received from or transmitted to the platform from other systems, such as financial institutions. Examples of such communications may include management alerts via an email, a text, or an application programming interface (API).

In some embodiments, different communication protocols may be used by the OBD tool. Examples of the different protocols may include, but are not limited to, SAE J1850 PWM, SAE J1850 VPW, ISO 9141-2, ISO 14230 KWP2000, or ISO 15765 CAN. In some embodiments, OBD-II communication protocol may have different modes, which may identify everything from powertrain information to emissions and vehicle identification information, among others. Additionally, each vehicle manufacturer may have special additional codes that can be identified.

Diagnostic trouble codes (DTCs) are defined by SAE, and the codes can be either generic or unique to the vehicle manufacturer. However, the codes all share the same five-alphanumeric format which allows for identification.

An OBD sensor may decode certain messages such as the VIN, the car battery voltage and special error code checking. The OBD tool may allow for a configurable set of parameters allowing for a default set of message types to be checked at a specific cadence. The OBD tool may be able to be set to a second resolution if needed for checking RPM, speed, or temperatures. In some embodiments, thresholds to alarm the different user roles of the remote asset detection system may be set at specific levels for the different parameters. For example, messages could be for fuel below a certain level or a speed higher than the max speed allowed on the lot. If no alarm is specified, then the OBD tool may transmit the information to the back-end to be decoded and analyzed. In some embodiments, the OBD tool may have a set of DTC scanning codes that match all manufacturers and will scan every time a vehicle is turned on, then have a configurable scan section to search for DTC codes that are non-standard but could be configured to search for based on a network message. For example, if there is a specific code that only applies to a 2014 Hyundai Sonata, when an OBD tool is associated to a 2014 Sonata, it may be instructed to look for this DTC in addition to the standard codes.

An example data flow may include an OBD sensor of the OBD tool reading codes from the OBD as it is first inserted into the OBD port of vehicle and during specific events. The sensors may parse the data obtained from the vehicle and pass the data, which may include DTC and parameter ID (PID) data, back to the back-end or platform of the remote asset detection system. The back-end or OBD tool may parse the unique codes and display the data to the different user roles of the system in different user interfaces.

In some embodiments, the OBD tool may have several security considerations. For example, the OBD tool may include a physical locking mechanism, opened via a specialized key. This lock may be constructed of high strength stainless steel, and will not detach from the OBD port without the key or without causing significant damage to the vehicle. The OBD tool may include a pass-through port (which may be referred to as an OBD II port) that can potentially allow for restricted remote access. All signal and power lines may be routed directly through the printed circuit board (PCB) board of the OBD tool, and hardware-based switches may be implemented to disable access to the OBD port through the pass-through port, if necessary. In some embodiments, access to some data through the pass-through port may be disabled remotely. In some embodiments, the port can only be accessed at specific locations or times for inspection. In some embodiments, special algorithms may be employed at the embedded level to ensure vehicle validity, and may report if the mechanical locking mechanism has been defeated for even the shortest amount of time. These algorithms may check a number of physical and communication vectors to compare an actual vehicle to a potential defeated device or emulator. The strength of the algorithms may increase as the OBD tool is deployed, because it will be able to adapt based on actual patterns encountered in the field.

In some embodiments, rolling key encryption may be built in at the communications module level to prevent spoofing using a Random Phase Multiple Access (RPMA) node, the main mode of communications for the OBD tool. In some embodiments, device payload masking and key pair encryption methods may add another element of security to the OBD tool.

The use of emulators or unauthorized vehicle engine control unit (ECU) access would require physical damage to the vehicle, which could be detected remotely in many cases.

Although the examples and descriptions herein are directed to cars, the systems and methods herein may be used with other assets, such as boats, construction vehicles, motorcycles, self-driving vehicles, recreational vehicles, airplanes, helicopters, autonomous vehicles, drones, unmanned aerial vehicles, and the like.

FIG. 1 depicts an example remote asset detection platform 100 for remote asset detection in accordance with one or more embodiments of the disclosure. In one example embodiment, a financial institution may finance a vehicle 105 and notify the remote asset detection platform 100, for example, via an API. For example, an OBD tool 110 may be installed on the vehicle 105. At operation 115, the OBD tool 110 may be activated in response to key events (e.g., insertion of the OBD tool, car movement, tampering with or removal of the OBD tool, etc.). The OBD tool 110 may transmit OBD codes, GPS, VIN number, and/or additional information. At operation 120, the data from the OBD tool 110 may be transmitted over a network and stored. The data from the OBD tool may be analyzed, and insights from the data may be presented through one or more platform interfaces 125. At operation 130, the financial institution may be notified of certain events based on predetermined rules.

The above-described embodiments are merely illustrative and not exhaustive and are not intended to be limiting in any way. Accordingly, variations, modifications, and equivalents of the embodiments disclosed herein are also within the scope of this disclosure.

Figure 2:
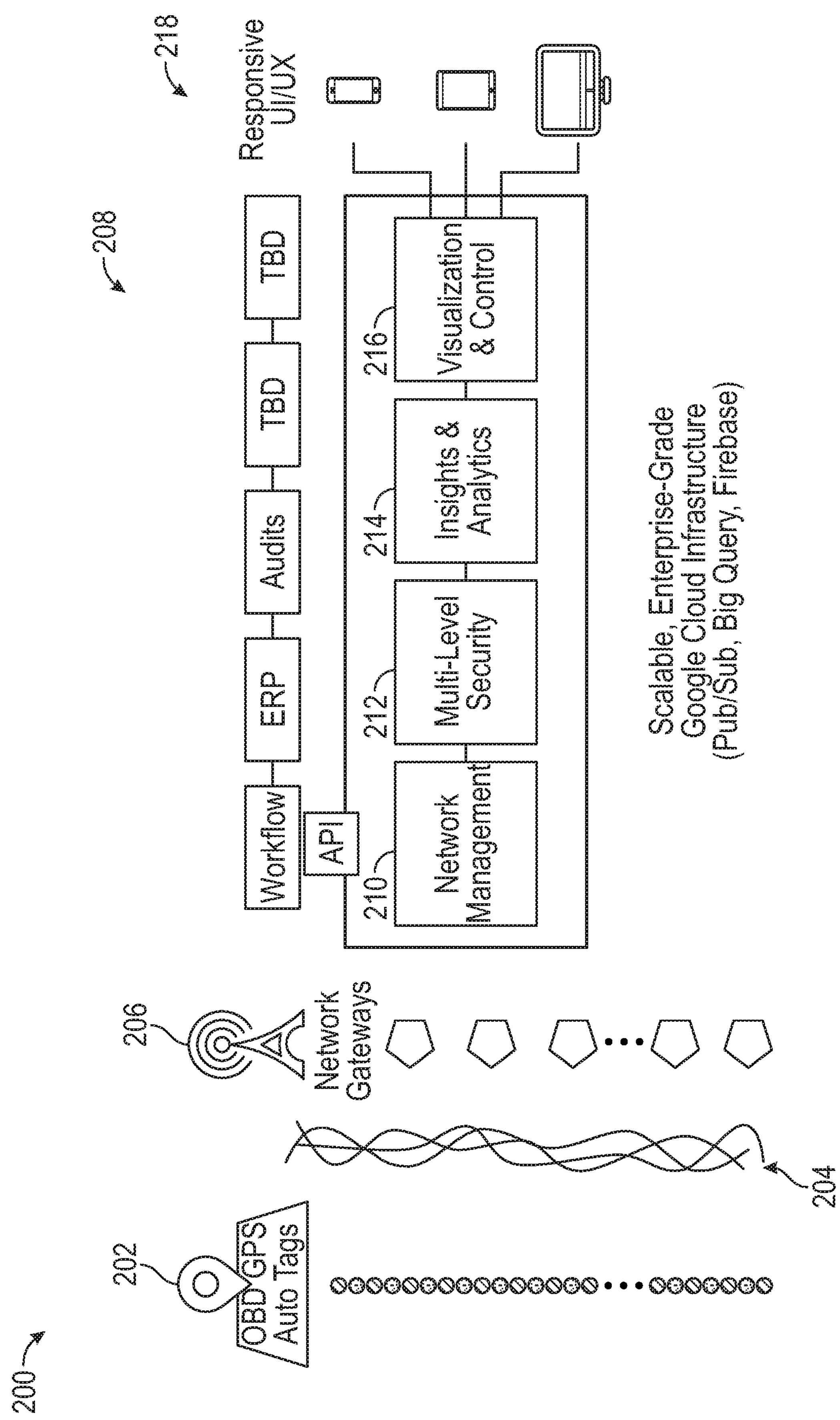
FIG. 2 is an example diagram for components of a remote asset detection system in accordance with one or more examples of the disclosure.

FIG. 2 depicts an example diagram for components of a remote asset detection system 200 in accordance with one or more example embodiments of the disclosure. In some embodiments, the OBD tools 202 may obtain data from the vehicle or via one or more components of the tools (e.g., GPS, accelerometer, etc.) and may transmit 204 the data to one or more network gateways 206. The data may be provided to a remote asset detection platform 208, where the data will be translated and analyzed by different components, such as the network management 210, multi-level security 212, insights and analytics 214, and visualization and control components 216. The data may then be made available through interactive interfaces 218 that may be presented on different types of devices, such as smartphones, tablets, laptops, or other computing devices.

FIGS. 3A-3D are schematic diagrams depicting various views of an on-board diagnostic tool for a remote asset detection system in accordance with one or more example embodiments of the disclosure. In some embodiments, the OBD tool may include locking mechanisms to lock the tool into the OBD port of a vehicle. The locking mechanism may reduce theft, tampering, or loss of the vehicle. The firmware of the OBD tool may control determination of OBD access by preventing unauthorized tampering of a vehicle's OBD status. In some embodiments, the firmware of the OBD tool may be remotely configurable. The OBD tool may provide remote access to complete vehicle diagnostics and may include a high-precision GPS unit and an on-board accelerometer. The accelerometer may detect vehicle movement outside of the vehicle diagnostics. The OBD tool may include complete over-the-air upgrade capability. Some non-limiting example specifications of the components of the OBD tool are listed below in Table 1.

TABLE 1

OBD Tool Example Specifications

| | |
|---|---|
| Frequency | 2.402-2.47563 GHz |
| Antenna Gain | 2.1 dBi, 10 dBm EIRP |
| RF Sensitivity | −142 dBm |
| Battery Type | Lithium Iron Phosphate Rechargeable 500 mAh |
| Battery Lifetime | Persistent (Direct Vehicle). Secondary Battery 3-6 months without vehicle power source |
| OBD Connectivity | Remote OBD Reading with Controlled SW pass-through |
| Physical Security | Universal Locking Mechanism |
| Network Protocol | RPMA |
| Accelerometer | 3 axis 2 g/4 g/8 g/16 g ultra low power |
| GPS GNSS | Tri-mode GPS/Galileo GLONASS. Geofencing and IMESS/QZSS optimization. 72 Channel |
| GPS Sensitivity | −165 dBm |
| Temperature Range | −40-85 C. |
| Environmental Rating | IP65 |
| Dimensions | 1.67 × 1.2 × 0.75 in |

Figure 3A:
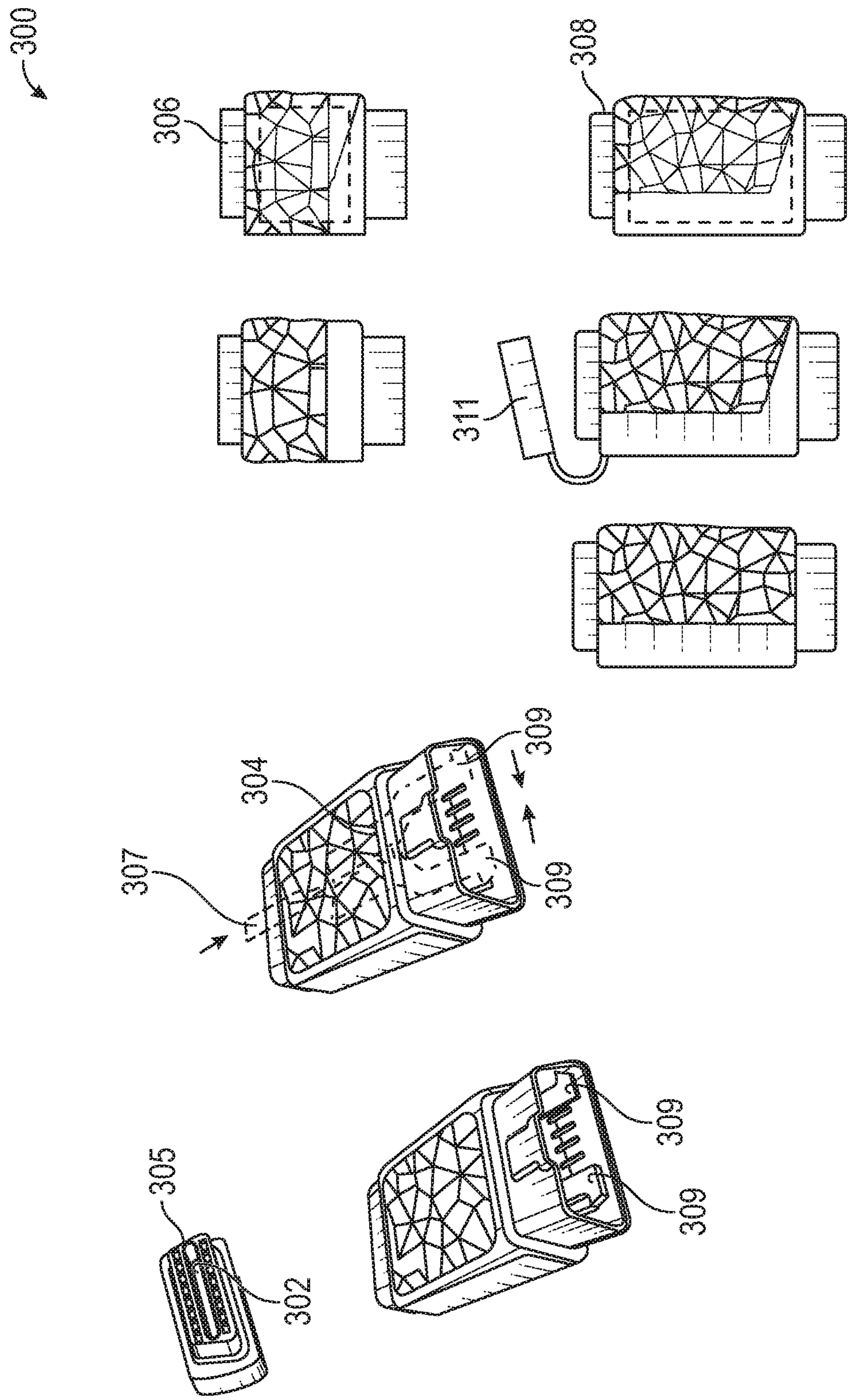
FIGS. 3A-3D are schematic diagrams depicting various views of an on-board diagnostic tool for a remote asset detection system in accordance with one or more example embodiments of the disclosure.

FIG. 3A depicts one example embodiment of the OBD tool 300. The embodiment depicted may be an all-in-one design concept that includes a connector, a PCB, and a pass-through in a single housing. As depicted, the OBD tool 300 may have a slot space 302 in the connector 305 used to contain a mechanical locking mechanism 304 with key (release access) 307. As depicted, the locking mechanism 304 may be integrated into the slot space 302 so that once the OBD tool 300 is plugged into the OBD port of the vehicle, the latches 309 of the locking mechanism 304 may lock onto a portion of the OBD port. The locking mechanism 304 may unlatch from the OBD port once a key 307 is inserted into the OBD tool to release the latches 309 from the OBD port. That is, the locking mechanism 304 may include two barbed latches 309 configured to flex when inserted into the OBD port and secure the OBD tool 300 therein. The key 307 may cause the barbed ends of the latches 309 to flex in the opposite direction in order to remove the OBD tool 300 from the OBD port. The barbs may face inward or outward. Similarly, the latches 309 may flex inward or outward. Additionally, an embodiment of the OBD tool 300 may include a footprint with two-boards stacked 306 or a footprint with a single board 308. In one embodiment, the OBD tool may have an attached cap 311 to cover the pass-through port of the OBD tool 300 when it is not in use.

Figure 3B:
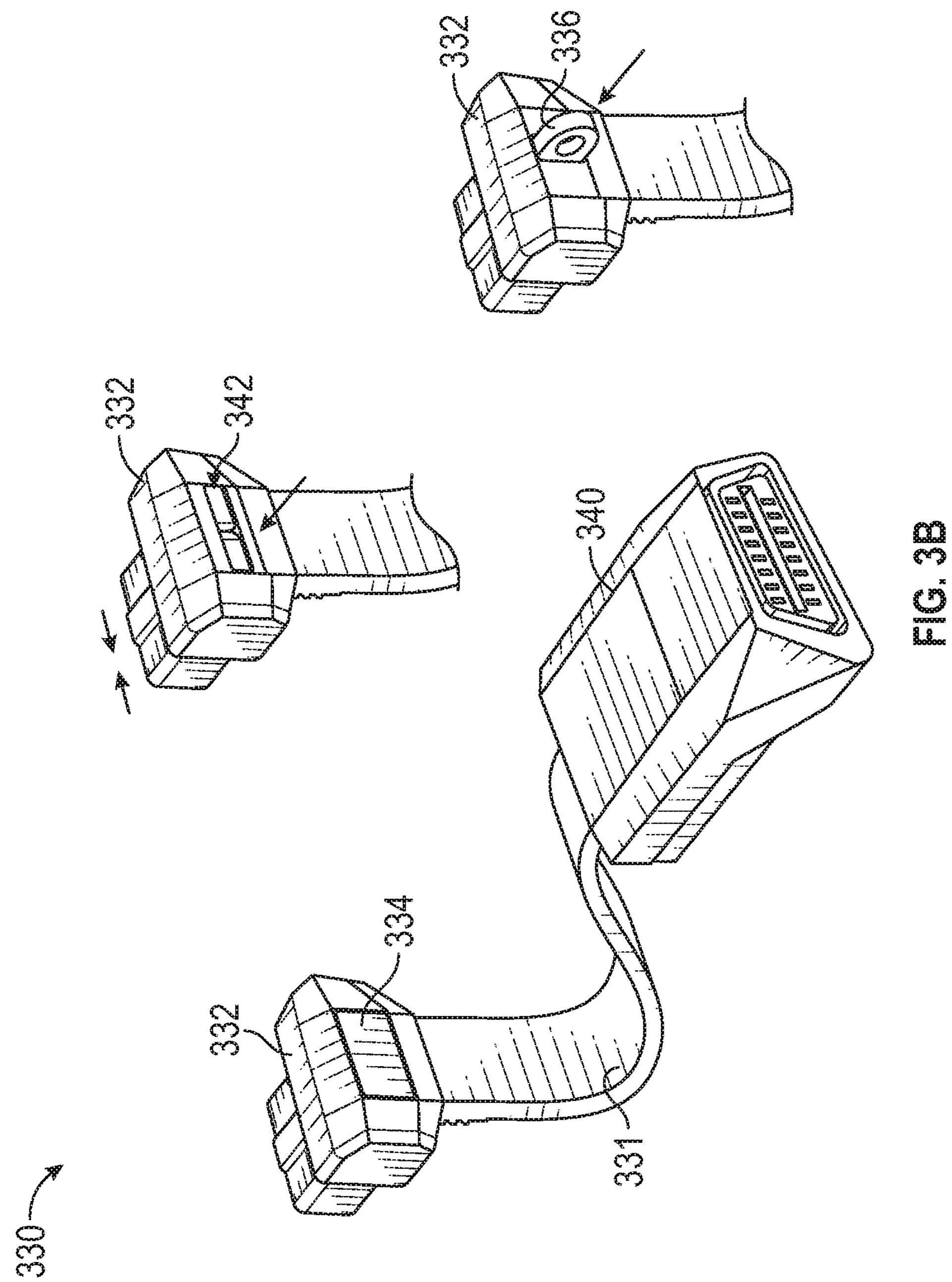

Now referring to FIG. 3B, an example embodiment with a tethered design for an OBD tool 330 is depicted. The tethered design may include a main body 340 having a PCB and pass-through that are housed separately from a connector 332. The main body 340 and the connector 332 may be attached to each other via a tether 331. In this manner, a separate PCB/pass-through design is disclosed, which allows for tight space restricted areas in vehicles. In some instances, the connector 332 may include a locking mechanism 342. In one example, the connector 332 of the OBD tool 330 may include a removable sticker 334 that can be removed to reveal the locking mechanism 342, which may be pressed or released using a special key to remove the connector 332 from the OBD port. In other instances, the connector 332 may include a ring 336. A lock or zip-tie point may be disposed within the ring 336. By removing the lock or zip tie, the ring 336 may be pressed in to disengage the locking mechanism and release the connector 332.

Figure 3C:
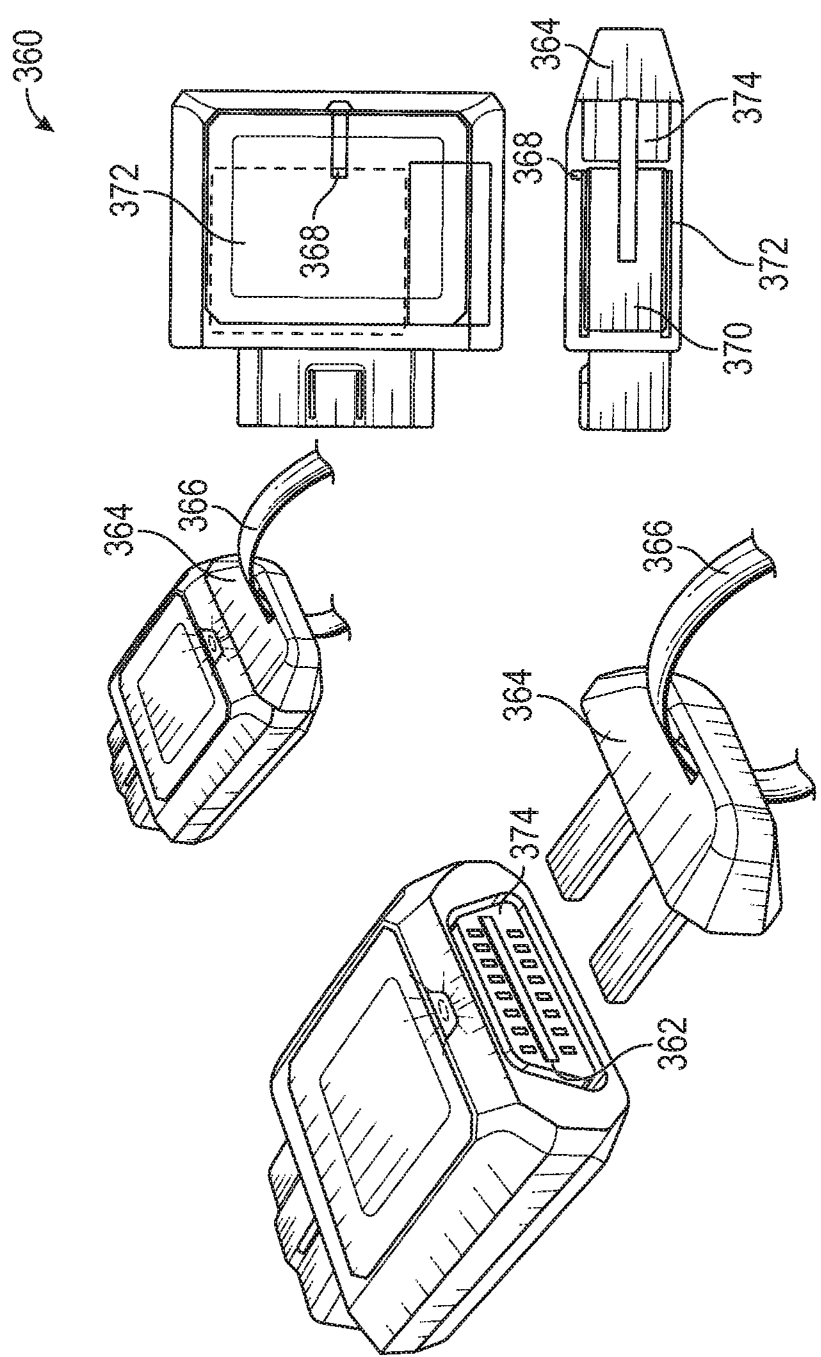

FIG. 3C depicts another embodiment of an OBD tool 360. An example center slot 362 may be the length of the OBD tool 360 and include the mechanical locking mechanism of the connector therein. An example key 364 may be inserted into the center slot 362 to release the locking mechanism. The key 364 may be attached to a tether or keychain detail 366 in the key cap. The OBD tool 360 may include an LED light pipe 368 to direct light to the front of the device. The OBD tool 360 may include a battery 370 housed in the device. One example battery that may be included in the device is the CR123A. Dual PCBs 372 (top and bottom) are disposed on opposite sides of the battery 370. The OBD tool 360 may include a pass-through mechanism 374 of the OBD tool 360. The pass-through mechanism 374 may enable a user to connect a device to the vehicle through the OBD tool 360.

Figure 3D:
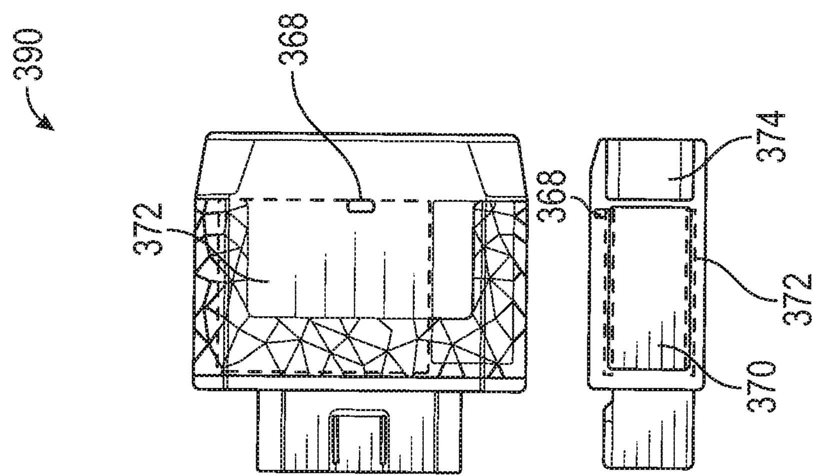
Figure 3D:
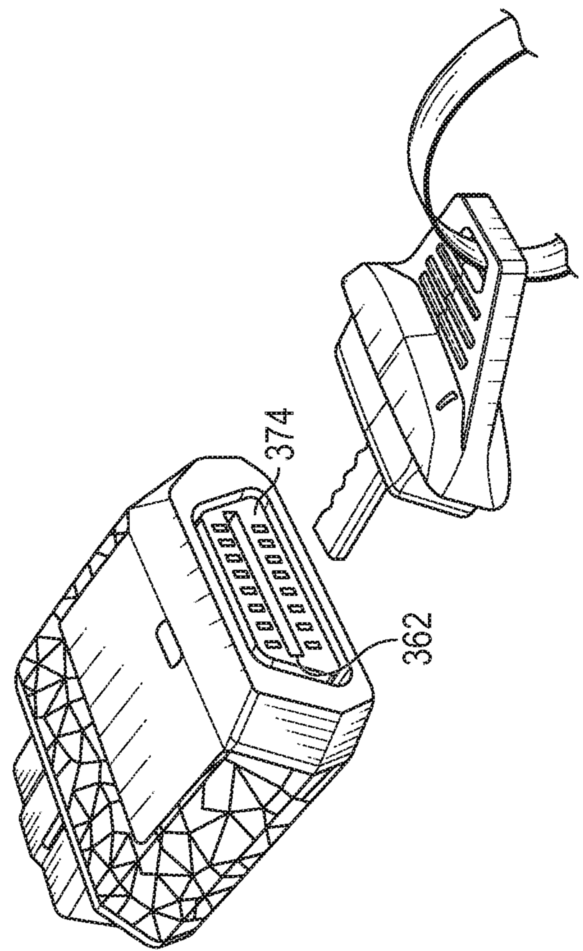

FIG. 3D depicts another example embodiment of an OBD tool 390. Similar to FIG. 3C, the OBD tool 390 may include a key access point 362 that comprises a slot in the pass-through connector side. The mating profile at the connector and the key profile promote exclusivity and quick access and removal. The OBD tool 390 may include a battery 370 housed in the device. The OBD tool 390 may also include dual PCBs 372 (top and bottom) on opposite sides of the battery 370. The OBD tool 390 may include a pass-through 374 and an LED light 368.

Figure 4A:
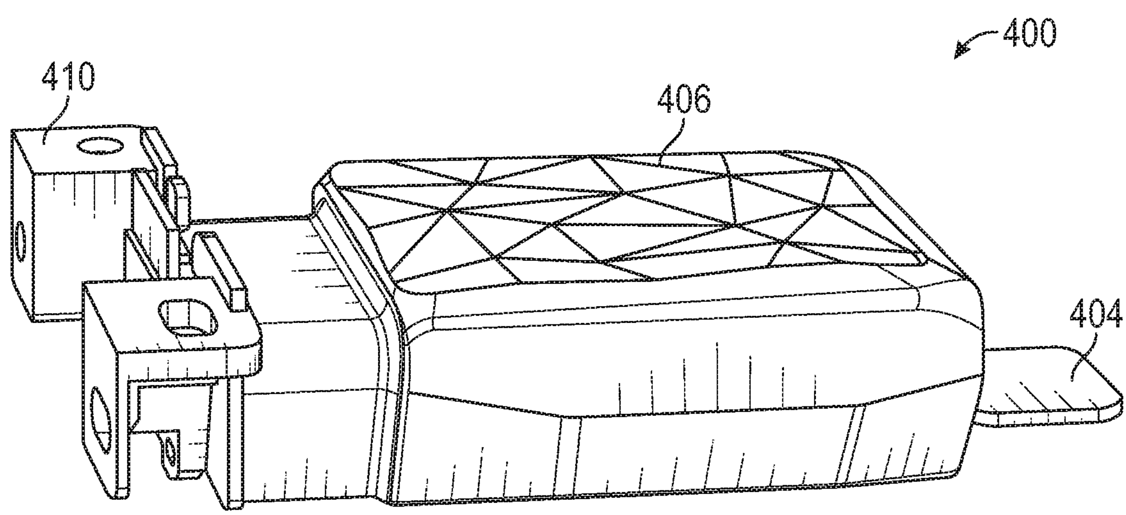
FIGS. 4A-4E are schematic diagrams depicting different views of an on-board diagnostic tool for a remote asset detection system in accordance with one or more embodiments of the disclosure.
Figure 4B:
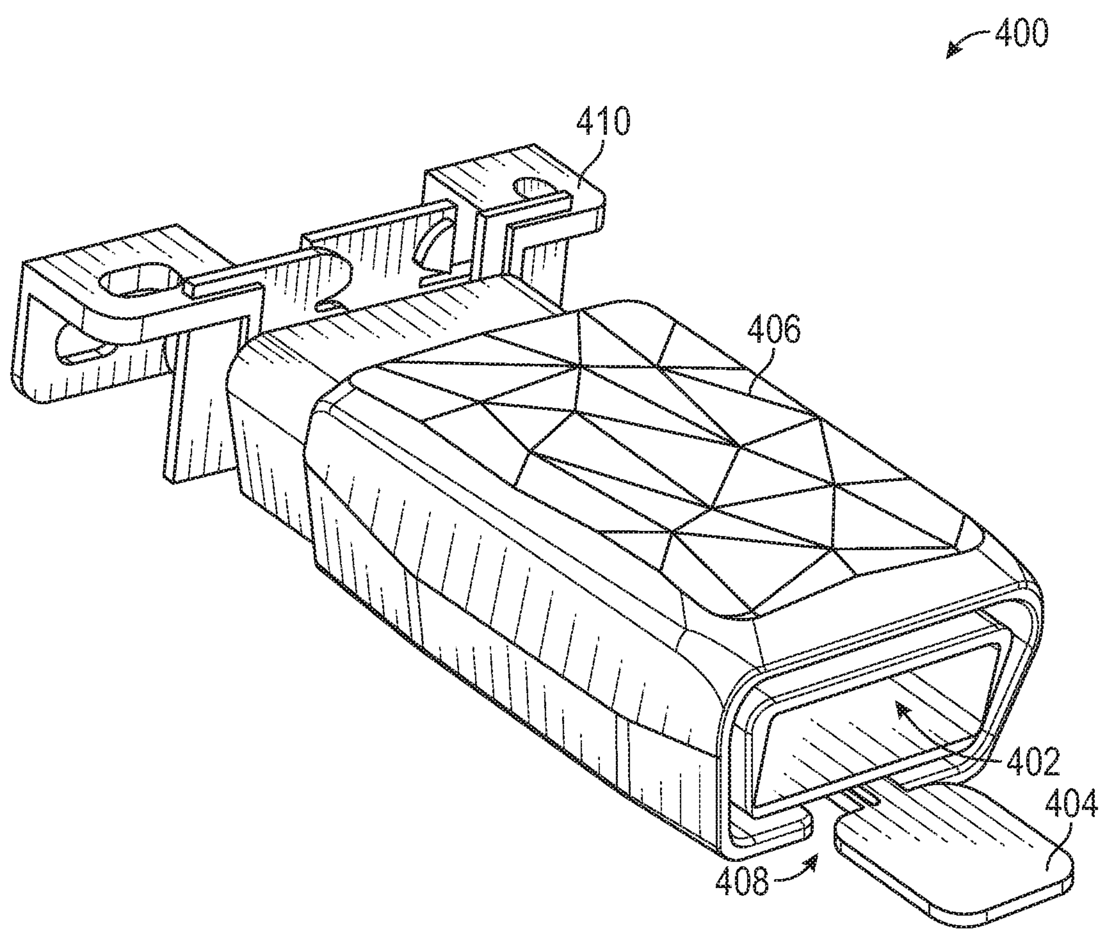
Figure 4C:
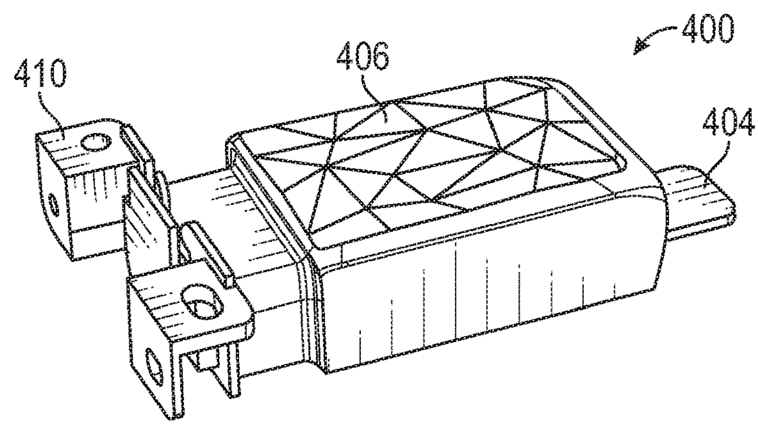
Figure 4D:
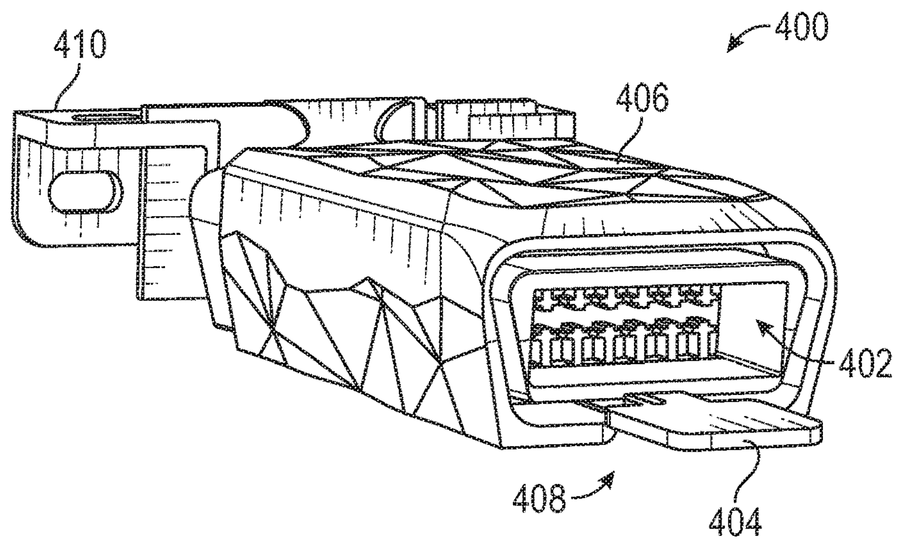
Figure 4E:
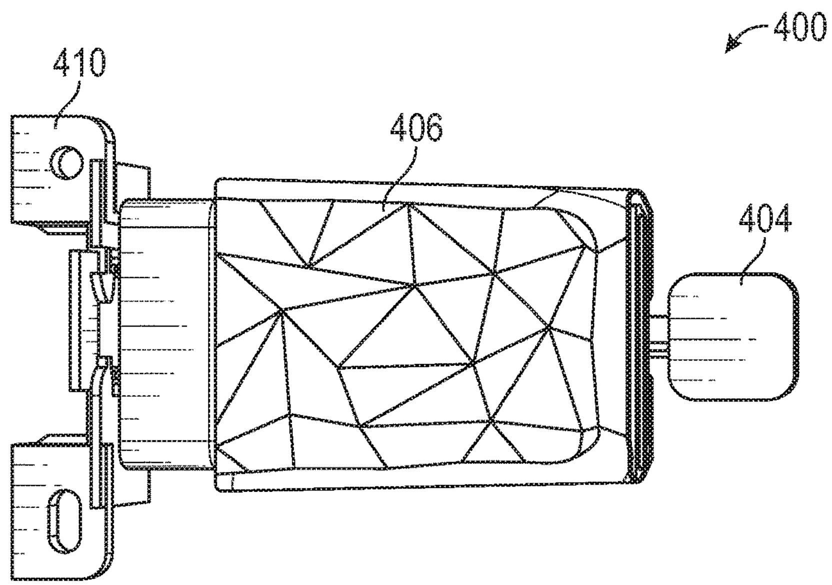

FIGS. 4A-4E are schematic diagrams depicting different views of an OBD tool 400 for a remote asset detection system in accordance with one or more embodiments of the disclosure. The OBD tool 400 includes a housing 406, a pass-through port 402, a key 404 disposed in a key slot 408. The OBD tool 400 is depicted as attached to a receptacle 410, which is attachable to a vehicle. In this manner, the receptacle 410 may form part of the OBD vehicle port in which the OBD tool 400 is attached via a connection. FIG. 4A is elevated side view of an OBD tool. FIG. 4B is a front and left elevation view of an OBD tool. FIG. 4C is a back and left elevation view of an OBD tool. FIG. 4D is a front perspective view of an OBD tool that depicts the pass-through port 402 and key entry point with a key 404 inserted therein. FIG. 4E is a top down view of an OBD tool.

Figure 5A:
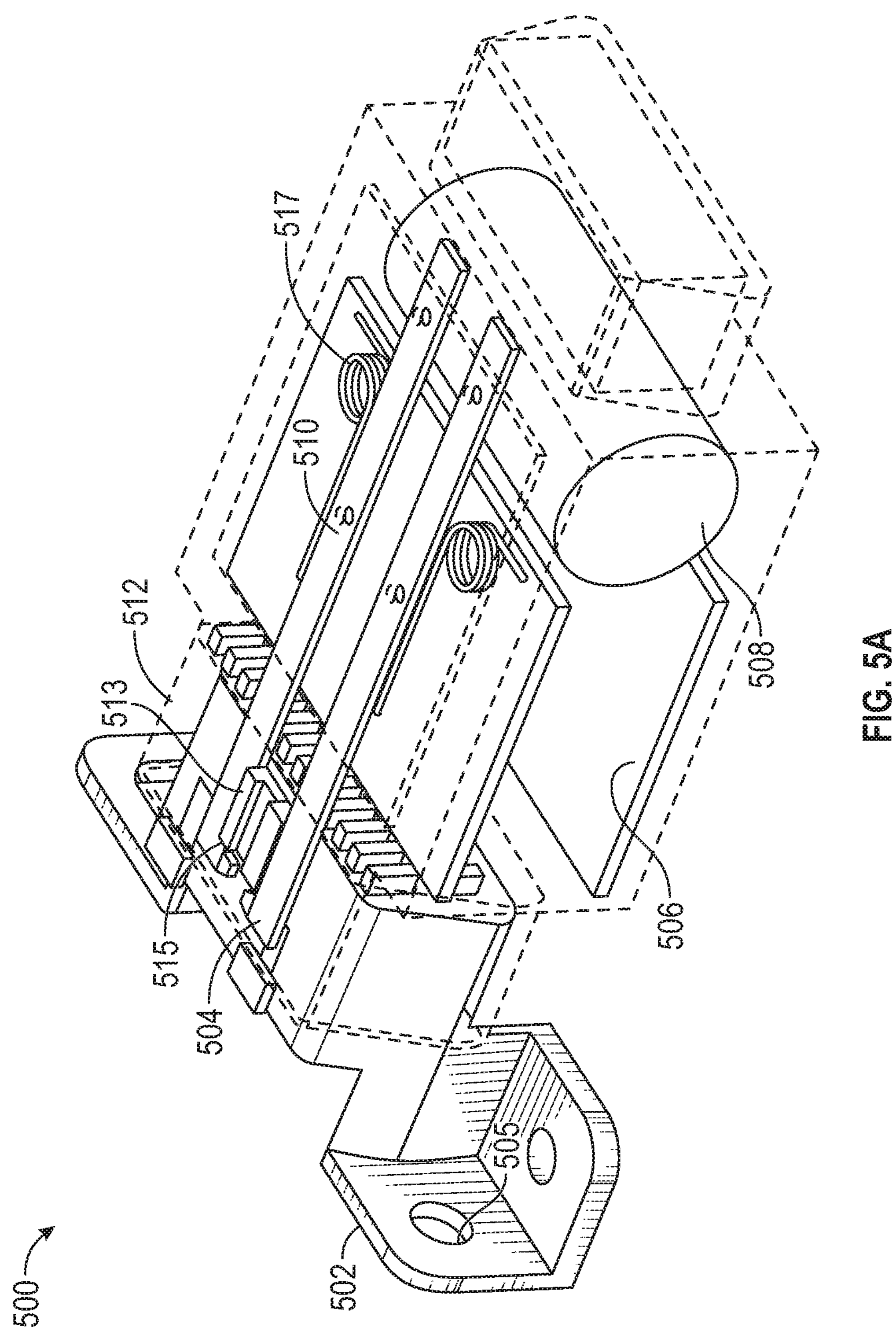
FIGS. 5A-5C are schematic diagrams depicting an example locking mechanism and pass-through port of an on-board diagnostic tool for a remote asset detection system in accordance with one or more embodiments of the disclosure.
Figure 5B:
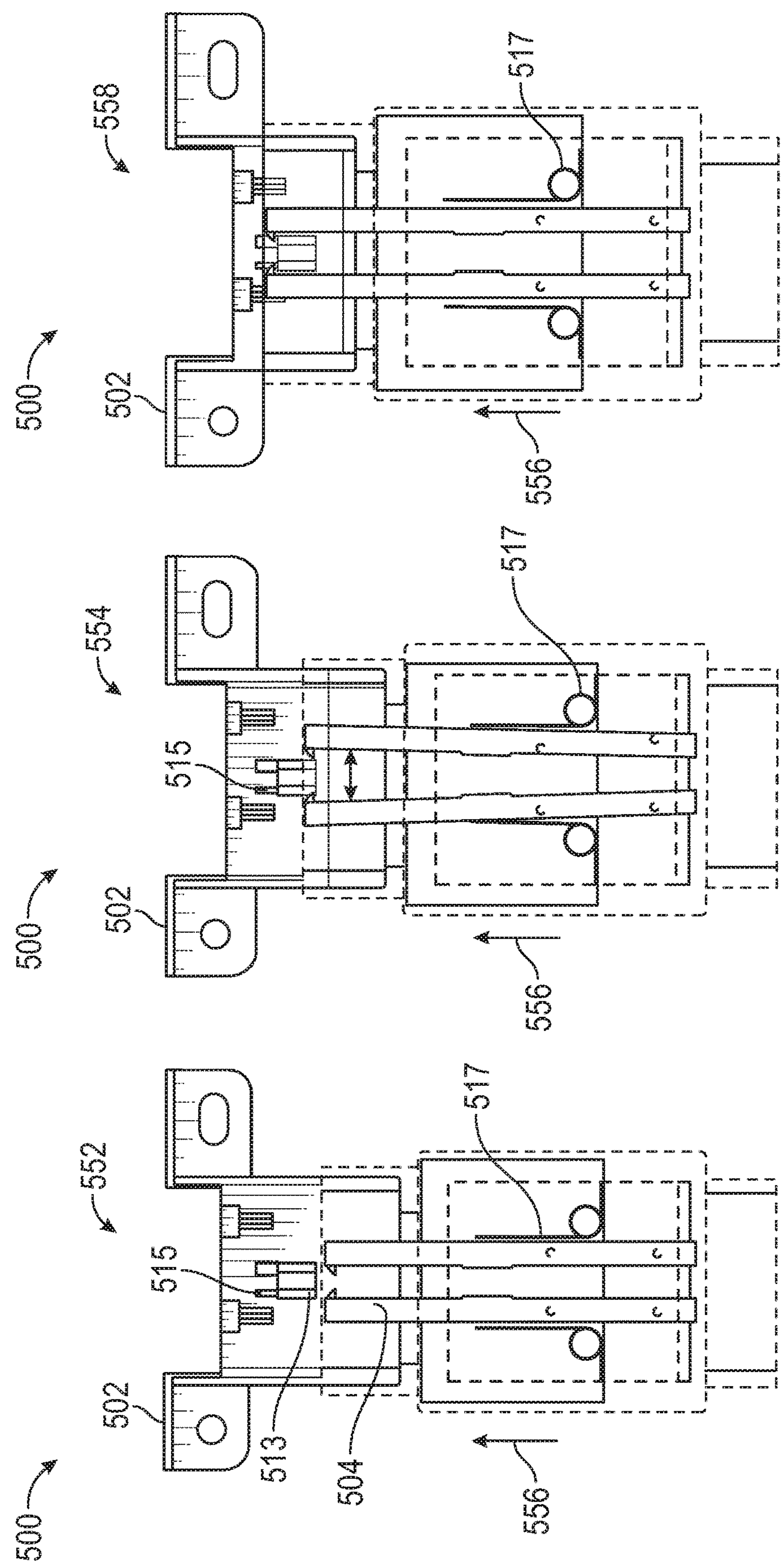
Figure 5C:
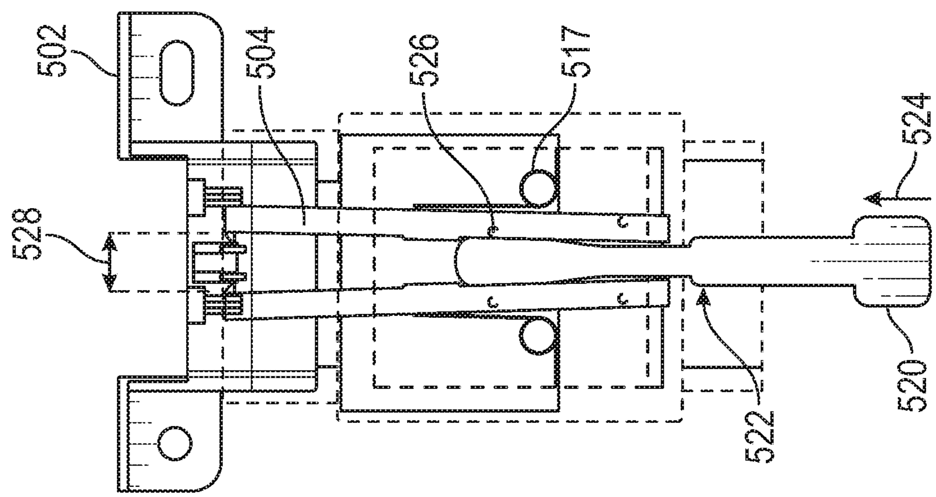
Figure 5C:
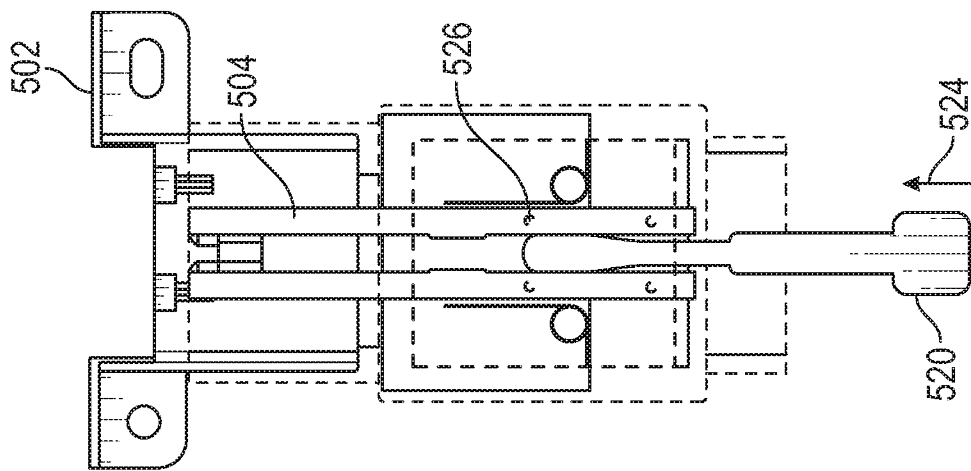

FIGS. 5A-5C are schematic diagrams depicting an example locking mechanism and pass-through port of an on-board diagnostic tool for a remote asset detection system in accordance with one or more embodiments of the disclosure. FIG. 5A schematically depicts components of a mechanical locking mechanism of an OBD tool 500. The OBD tool 500 may be configured to mate with a vehicle-mounted receptacle 502 used to attach the OBD tool 500 to the vehicle once inserted into the OBD port to provide support for the OBD tool 500. For example, one or more fasteners may be disposed through one or more holes 505 in the receptacle 502 to secure the receptacle 502 to the vehicle. The OBD tool 500 may then be attached to the receptacle 502. For example, the OBD tool 500 and the receptacle 502 may include corresponding male and female connections. The OBD tool 500 may include a housing 512. Latches 504 of the mechanical locking system may be disposed at least partially within the housing 512. The latches 504 may be configured to separate to grab or hook onto a feature on the receptacle 502. For example, the latches 504 may include barbs or hooked ends. The OBD tool 500 may include PCBs 506 within the housing 512. The OBD tool 500 also may include a battery 508. A spring-loaded component 510 may be configured to move the latches 504. For example, the spring-loaded component 510 may include one or more springs 517 in mechanical communication with the latches 504. The spring 517 may force the latches 504 into a closed configuration. In this manner, the spring force of the springs 517 may be overcome in order to open the latches 504 and disconnect the OBD tool 500 from the receptacle 502.

FIG. 5B depicts a series of steps of the OBD tool 500 that demonstrates the mechanical locking mechanism. As shown in step 552, when the latches 504 are in a resting position, they are parallel to each other and perpendicular to the OBD port. The arrow 556 indicates the direction the OBD tool 500 is pushed to install the unit onto the vehicle receptacle 502, which includes one or more protrusions 513 with ledges or lips 515 to which the barbs or the latches can engage. At step 554, the latches 504 spread apart during installation of the OBD tool such that the bards reach around the protrusions 513 of the receptacle 502 in the OBD port. At step 558, once the barbs of the latches 504 reach the end of the protrusion 513, the barbs engage the ledges or lips 515, and the latches 504 snap back in their parallel state due to the spring force of the spring 517. The barbs of the latches 504 prevent the OBD tool 500 from being pulled out without a key or other mechanism to spread the latches 504 apart to create enough space to release the feature of the OBD port that it is latched onto. In some embodiments, the barbs on the one or more latches of the mechanical locking mechanism may be positioned to face outward to snap onto an inner receptacle of the OBD port. That is, the inverse configuration is possible.

FIG. 5C depicts a series of steps of the OBD tool 500 that demonstrates the use of a key 520 to release the mechanical locking mechanism. For example, the key 520 may be inserted into a key space 522, as indicated by arrow 524, which is located between the spring-loaded latches 504. The latches 504 may pivot about a pivot point 526. That is, the insertion of the key 520 may overcome the spring force of the spring 517 to cause the latches 504 to rotate about the pivot point 526 to disengage the barbed ends of the latches 504 from the ledges or lips 515, as indicated by arrows 528, which enables the OBD tool 500 to be disengaged from the receptacle 502.

Figure 6:
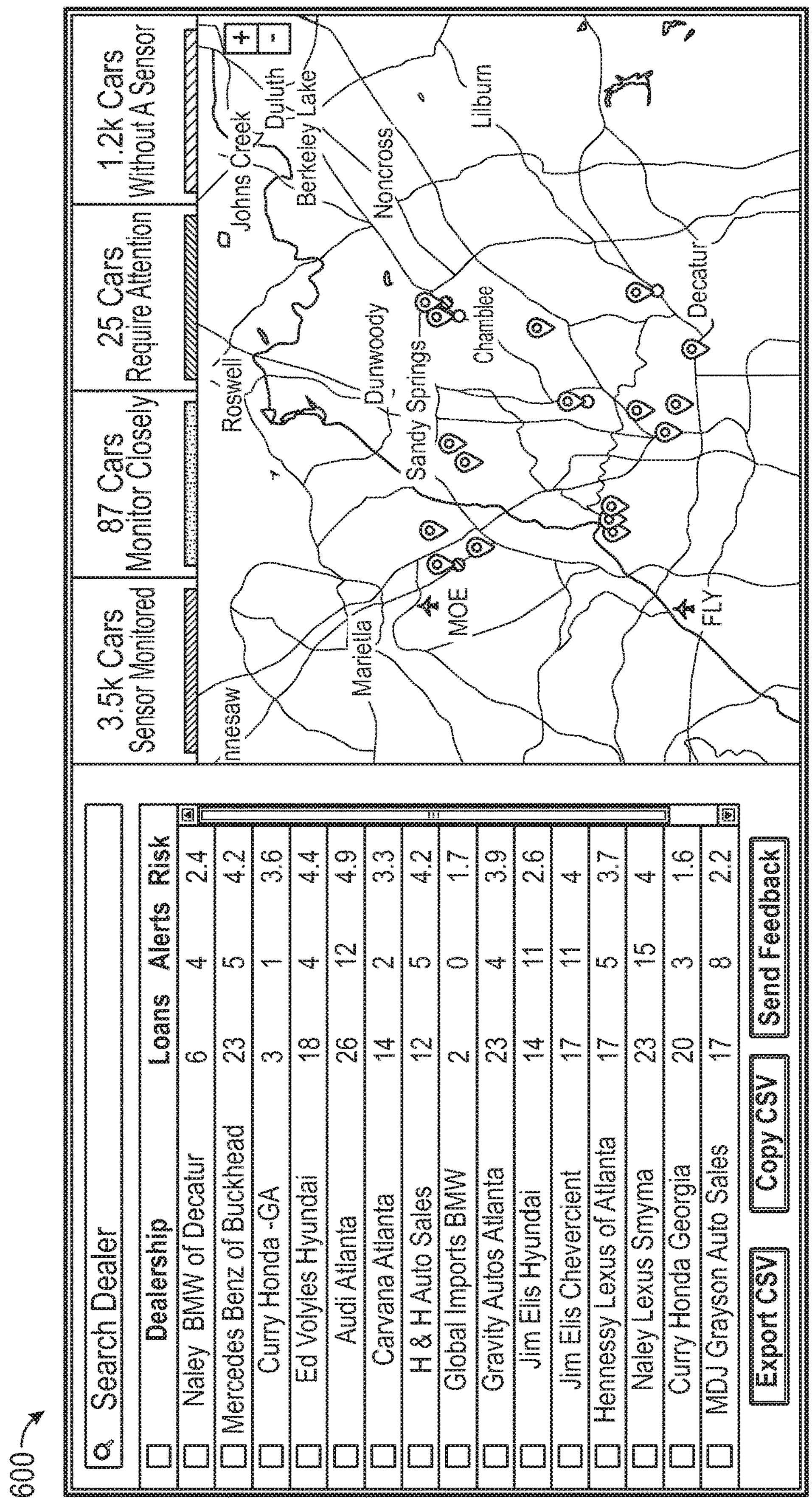
FIGS. 6-8 are diagrams depicting example user interfaces for a remote asset detection system in accordance with one or more embodiments of the disclosure.

FIG. 6 is a diagram that depicts example user interfaces 600 for a remote asset detection system in accordance with one or more embodiments of the disclosure. The platform of the remote asset detection system may use the data obtained from the OBD tools and other sources to generate a user interface that may be used to easily zero in on assets that require attention. For example, the user interfaces 600 may include maps and/or itemized data.

Figure 7:
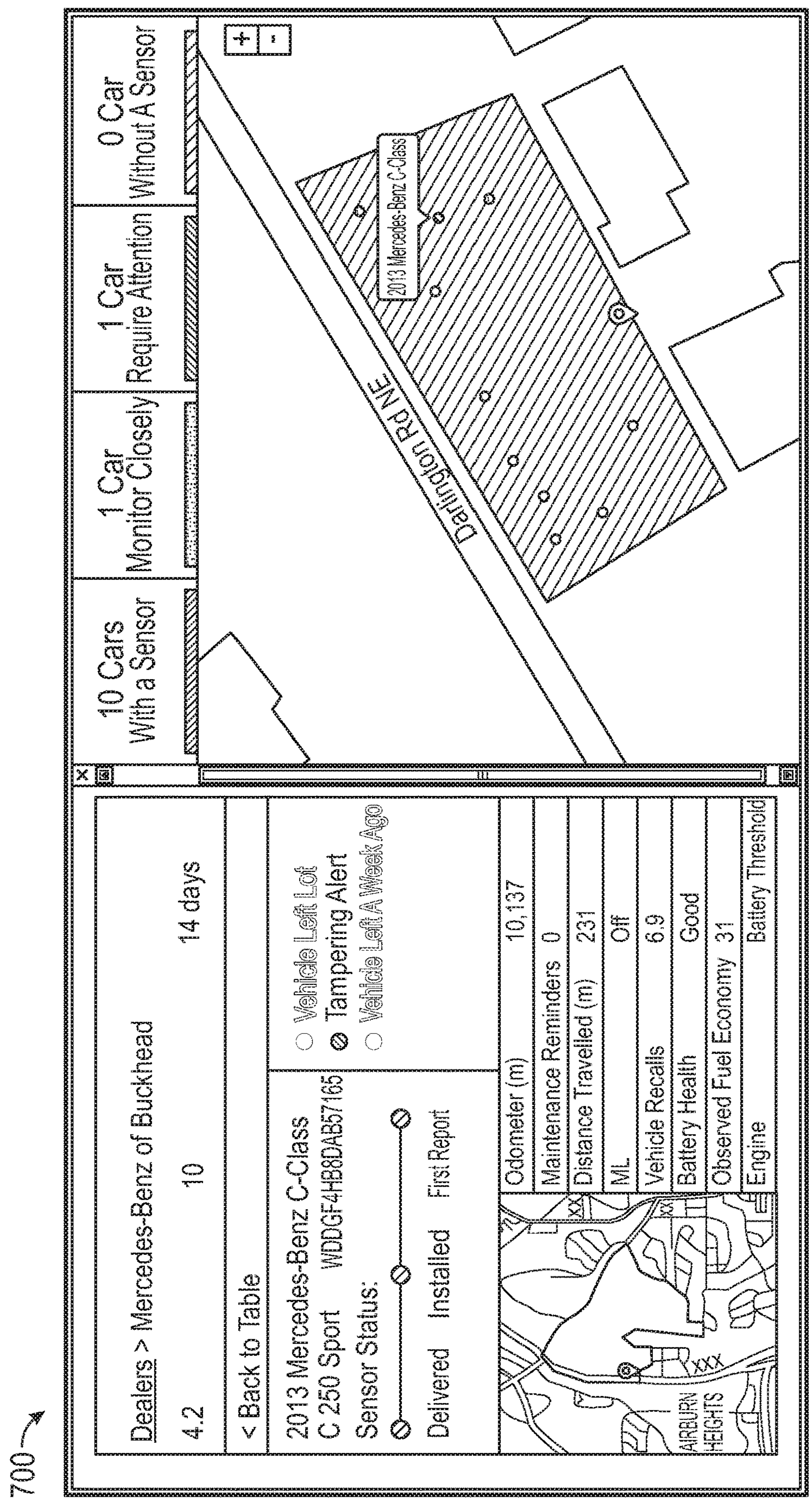

FIG. 7 is a diagram that depicts example user interfaces 700 for a remote asset detection system in accordance with one or more embodiments of the disclosure. The platform of the remote asset detection system may use the data obtained from the OBD tools and other sources to generate an interface that shows the exact location of a vehicle, current issues, and the history of the vehicle since being associated with a particular lot or location.

Figure 8:
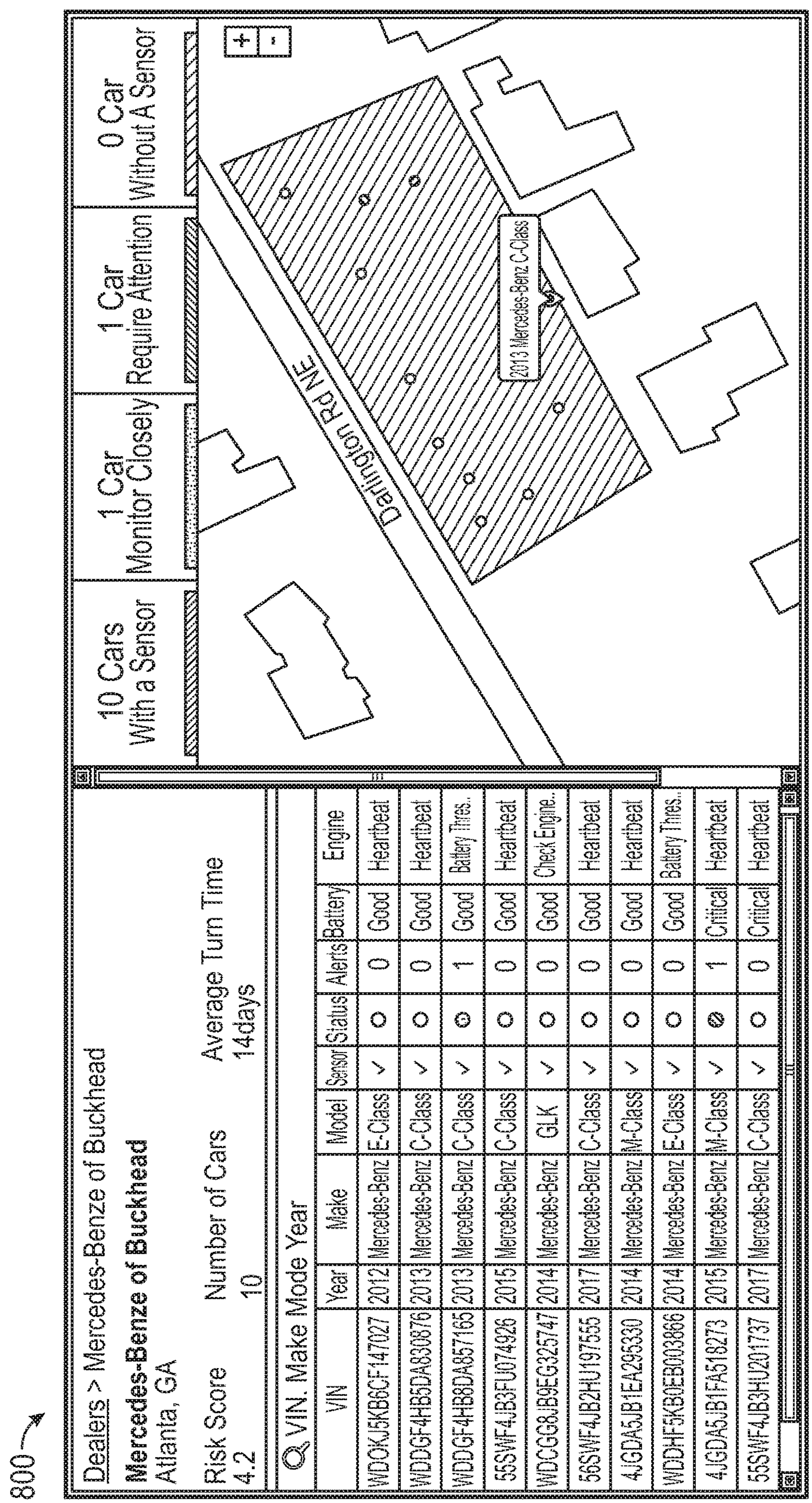

FIG. 8 is a diagram that depicts example user interfaces 800 for a remote asset detection system in accordance with one or more embodiments of the disclosure. The platform of the remote asset detection system may use the data obtained from the OBD tools and other sources to generate an interface that shows a risk score determined by an analytics engine using the data from the OBD tools and other sources and identifies high risk assets.

Figure 9:
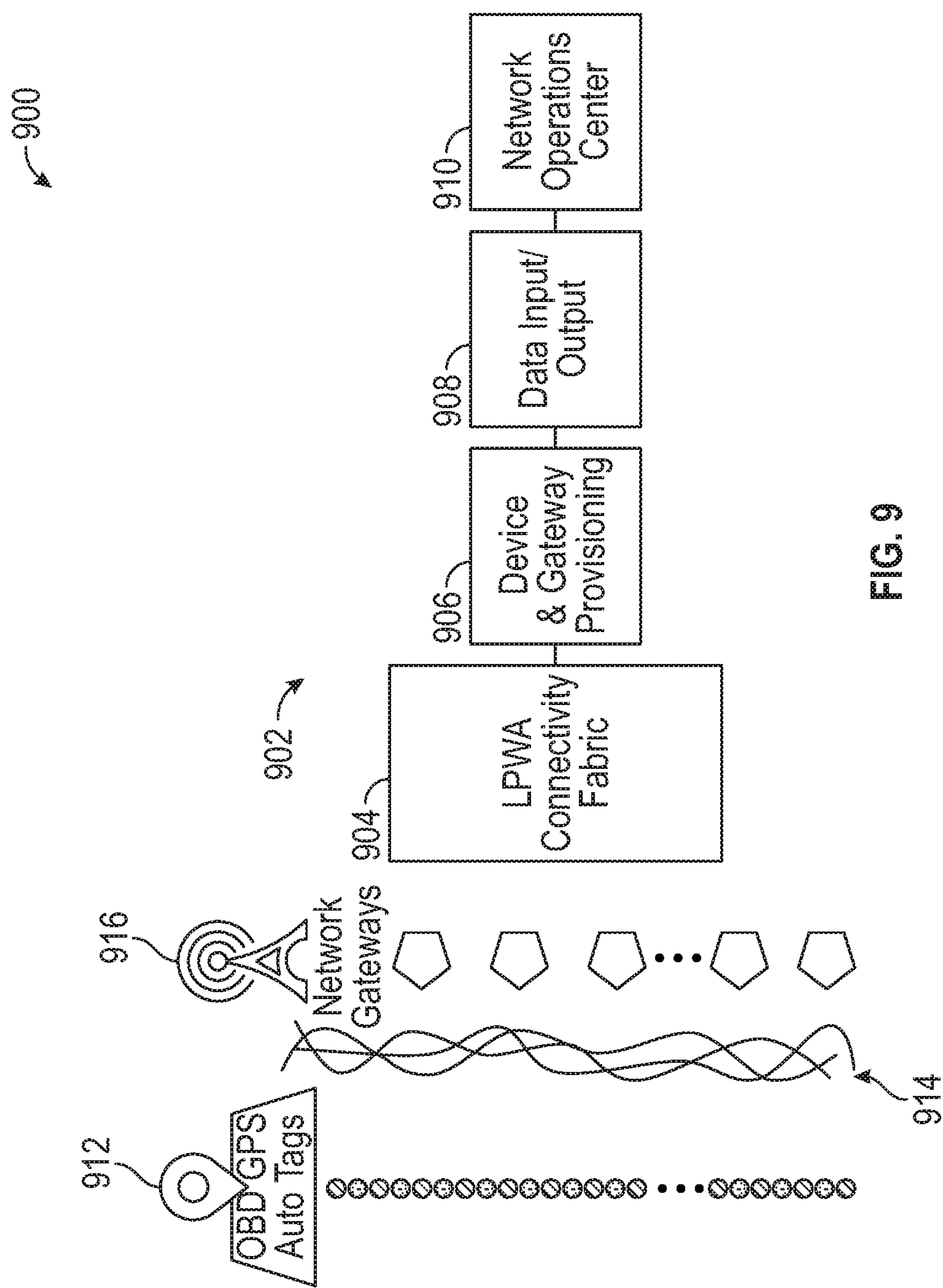
FIGS. 9-12 are example diagrams for components of a remote asset detection system in accordance with one or more examples of the disclosure.

FIG. 9 is an example diagram for components of a remote asset detection system 900 in accordance with one or more example embodiments of the disclosure. In some embodiments, the OBD tools 912 may obtain data from the vehicle or via one or more components of the tools (e.g., GPS, accelerometer, etc.) and may transmit 914 the data to one or more network gateways 916. The data may be provided to network management components 902 that include an LPWA connectivity fabric 904, device and gateway provisioning 906, data input/output 908, and a network operations center 910. The network management of the remote asset detection system 900 may provide carrier-grade quality-of-service (QoS) guarantees, a highly scalable LPWA network server, and network state monitoring with alarms, notifications, and logs. Radio planning capabilities for optimal network coverage may also be provided. In some embodiments, over-the-air firmware upgrades and remote device maintenance may be available for the OBD tools.

Figure 10:
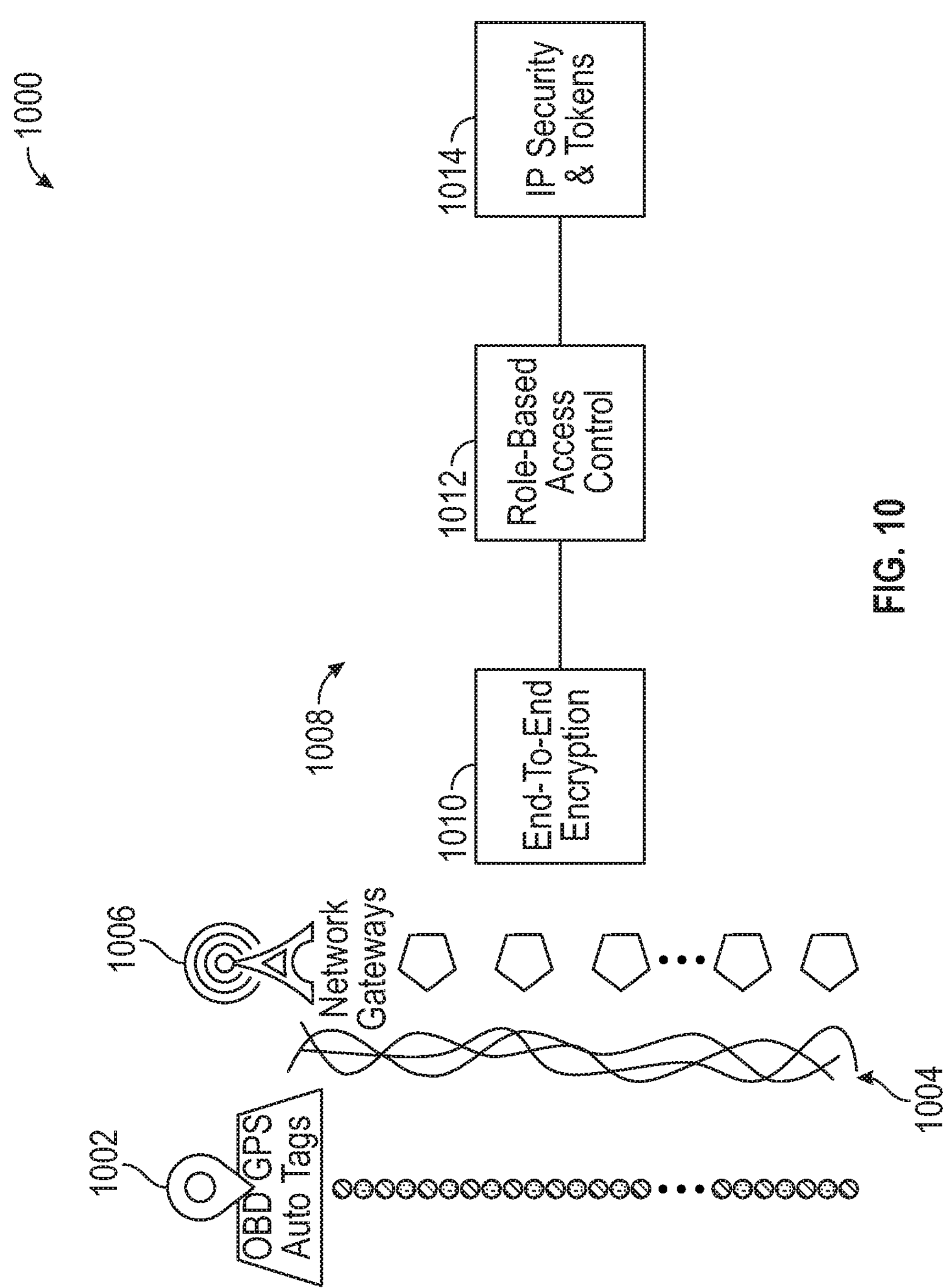

FIG. 10 is an example diagram for components of a remote asset detection system 1000 in accordance with one or more example embodiments of the disclosure. In some embodiments, the OBD tools 1002 may obtain data from the vehicle or via one or more components of the tools (e.g., GPS, accelerometer, etc.) and may transmit 1004 the data to one or more network gateways 1006. The data may be provided to the multi-level security components 1008 for the remote asset detection system, such as end-to-end encryption 1010, role-based access control 1012, and IP security and tokens 1014. In some embodiments, AES-128 bit packet decryption (uplink) and encryption (downlink) may be provided. Device state maintenance with sequence numbers and session keys may be handled by the multi-level security components 1008. HTTPS IP connectivity with secure tokens and fine-grained role-based access control, fully configurable at the application level, may be provided.

Figure 11:
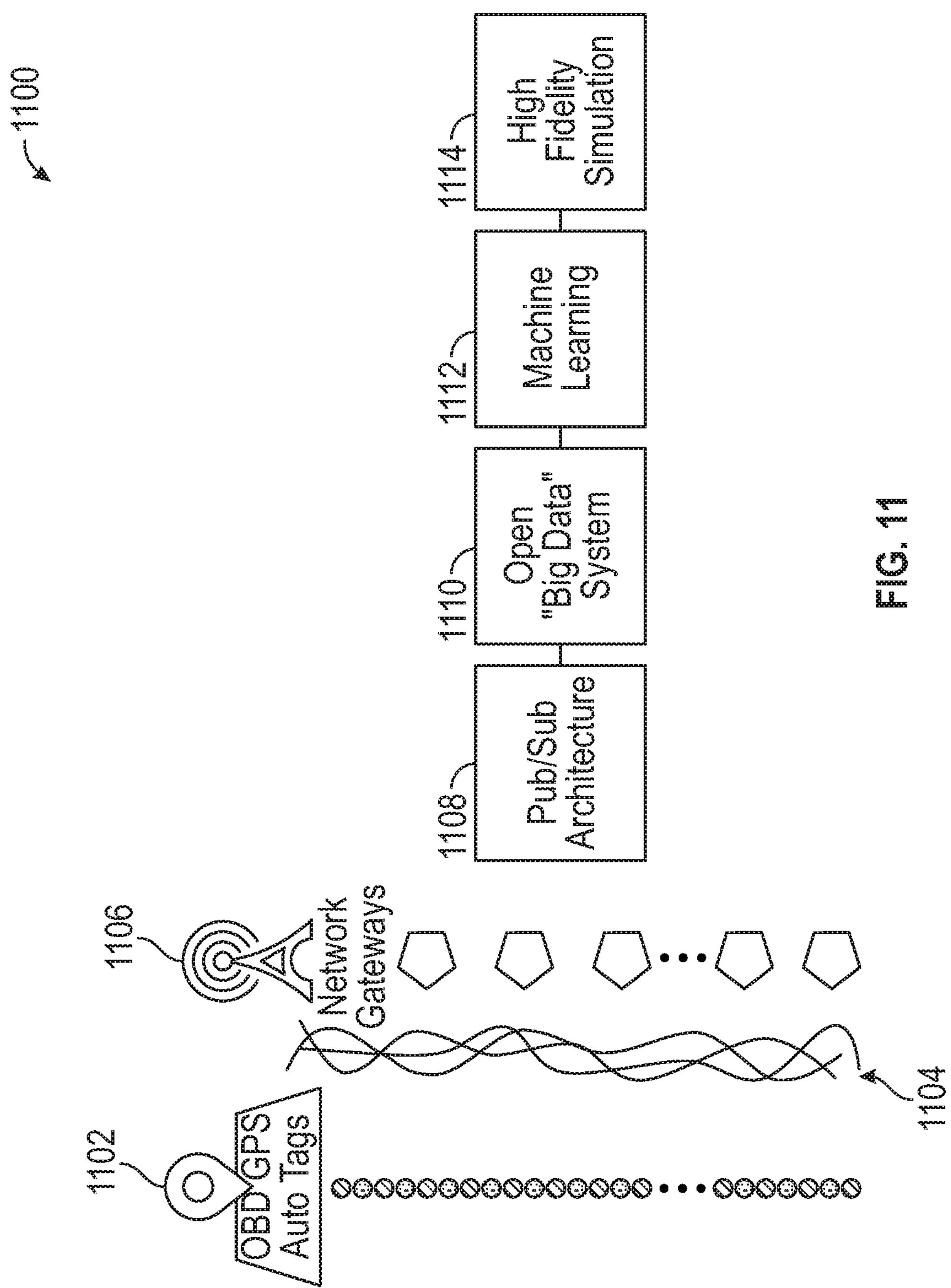

FIG. 11 is an example diagram for components of a remote asset detection system 1100 in accordance with one or more example embodiments of the disclosure. In some embodiments, the OBD tools 1102 may obtain data from the vehicle or via one or more components of the tools (e.g., GPS, accelerometer, etc.) and may transmit 1104 the data to one or more network gateways 1106. The data may be provided to insights and analytics components for the remote asset detection system, which may include pub/sub architecture 1108, open "big data" system 1110, machine learning 1112, and high fidelity simulation 1114. In some embodiments, the insights and analytics components may use a virtual machine and container-based system and architecture. An open, API-based system with built-in support for UDP, MQTT, HTTP, and AQMP protocols may be implemented. A big-data architecture comprised of SQL, noSQL, and time-series databases with unlimited storage may be utilized. Predictive analytics and machine learning (e.g., IBM Watson analytics and Google TensorFlow) may also provide business insights. End-to-end simulation for performance modeling, stress testing, and user training may be provided.

Figure 12:
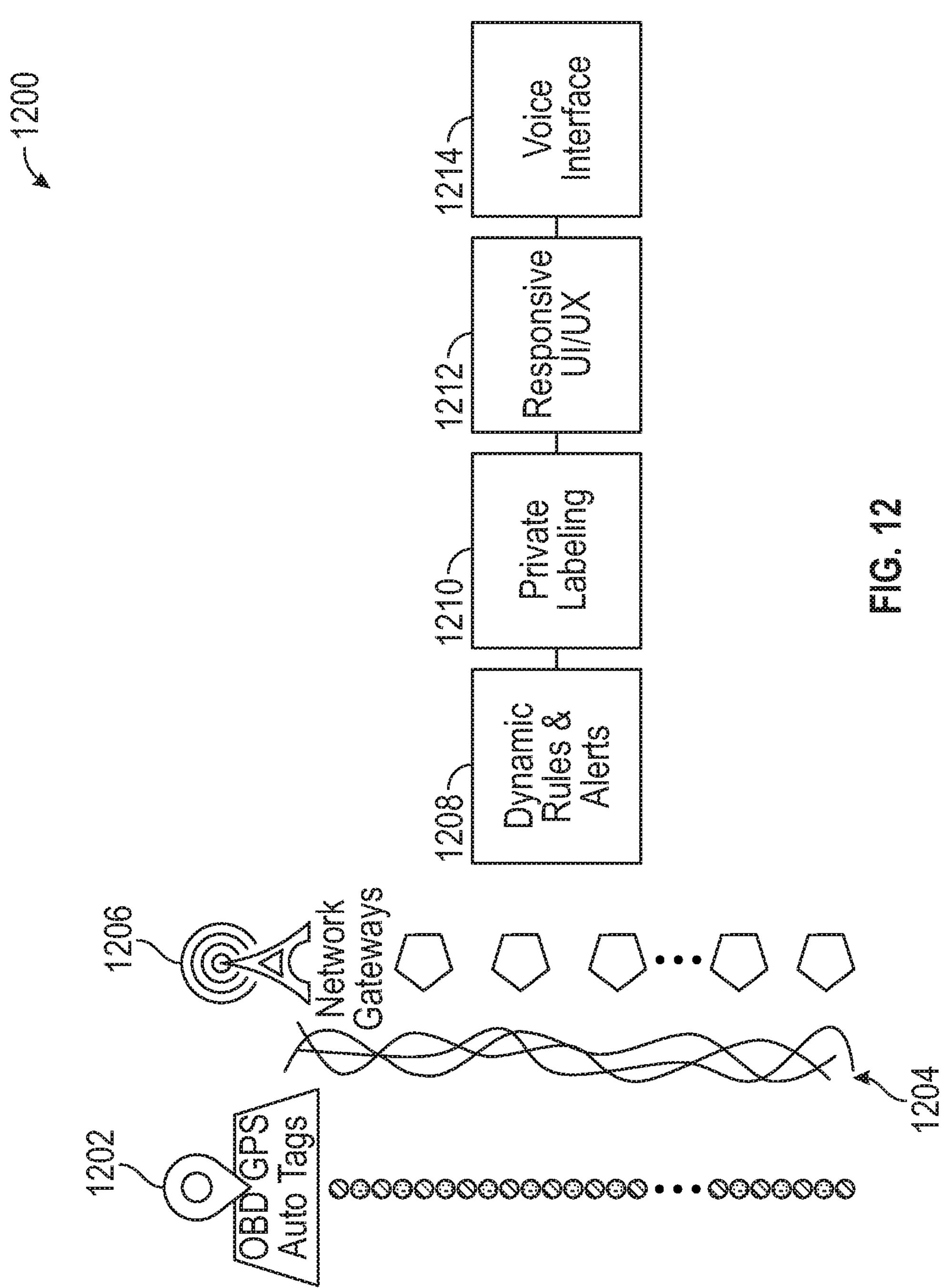

FIG. 12 is an example diagram for components of a remote asset detection system 1200 in accordance with one or more example embodiments of the disclosure. In some embodiments, the OBD tools 1202 may obtain data from the vehicle or via one or more components of the tools (e.g., GPS, accelerometer, etc.) and may transmit 1204 the data to one or more network gateways 1206. The data may be provided to visualization and control components for the remote asset detection system. In some embodiments, the components may include dynamic rules and alerts 1208, private labeling 1210, responsive user interfaces and user interactions 1212, and voice interfaces 1214. In some embodiments, the system may use distributed rules engines and a multi-model alerting system (e.g., email, text, audio, social, etc.). The user interfaces may be customizable and white labeled. The systems may have built-in integration with voice systems, such as Amazon Alexa and Google Home. Support for mobile, tablet, and desktop web applications plus native mobile applications may be provided. Interactive map displays with user-defined shapes, geo-filters, and contextual search may be provided.

Figure 13:
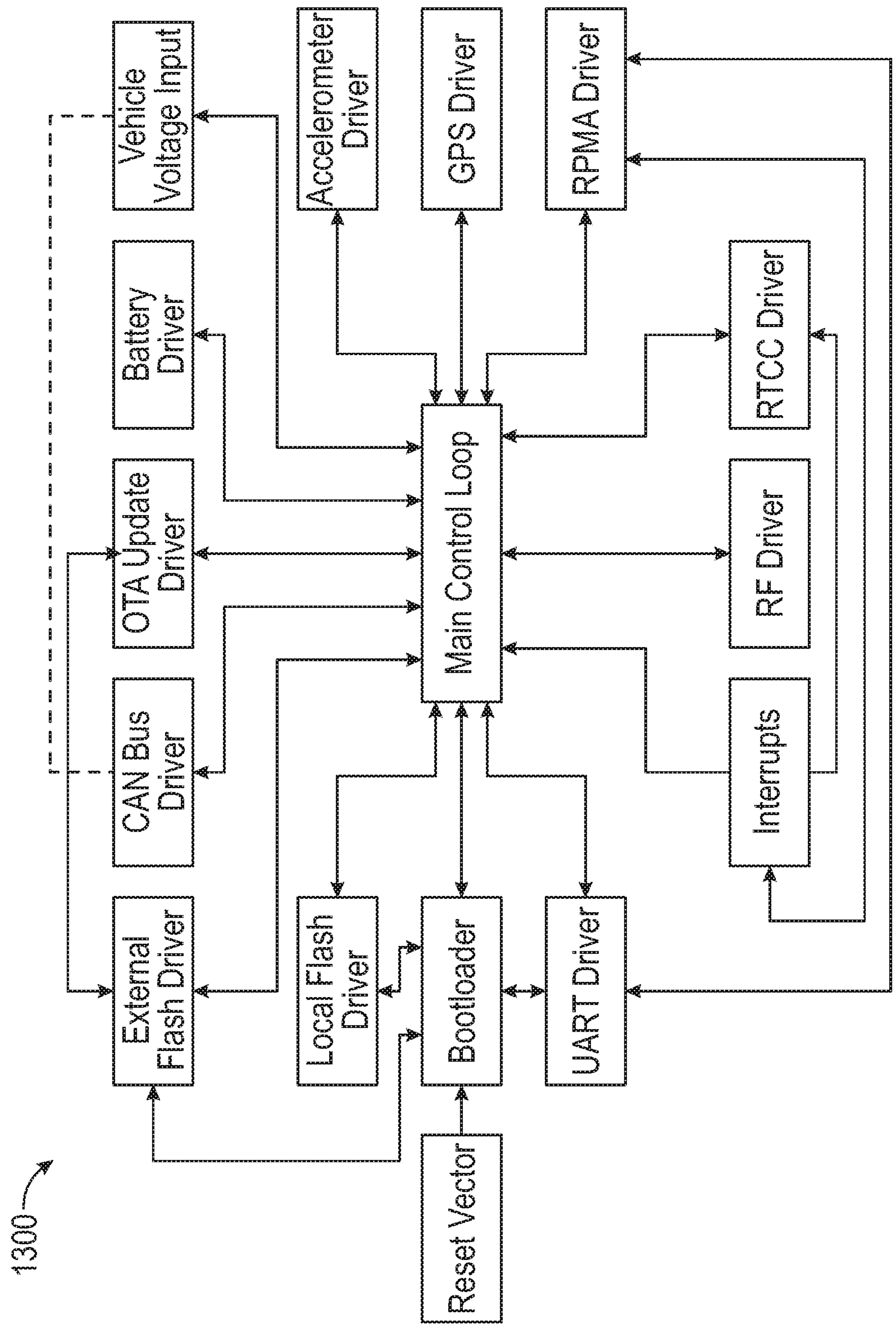
FIG. 13 is an example block flow diagram for components of a remote asset detection system in accordance with one or more embodiments of the disclosure.

FIG. 13 is an example block flow diagram 1300 for components of a remote asset detection system in accordance with one or more embodiments of the disclosure.

Figure 14:
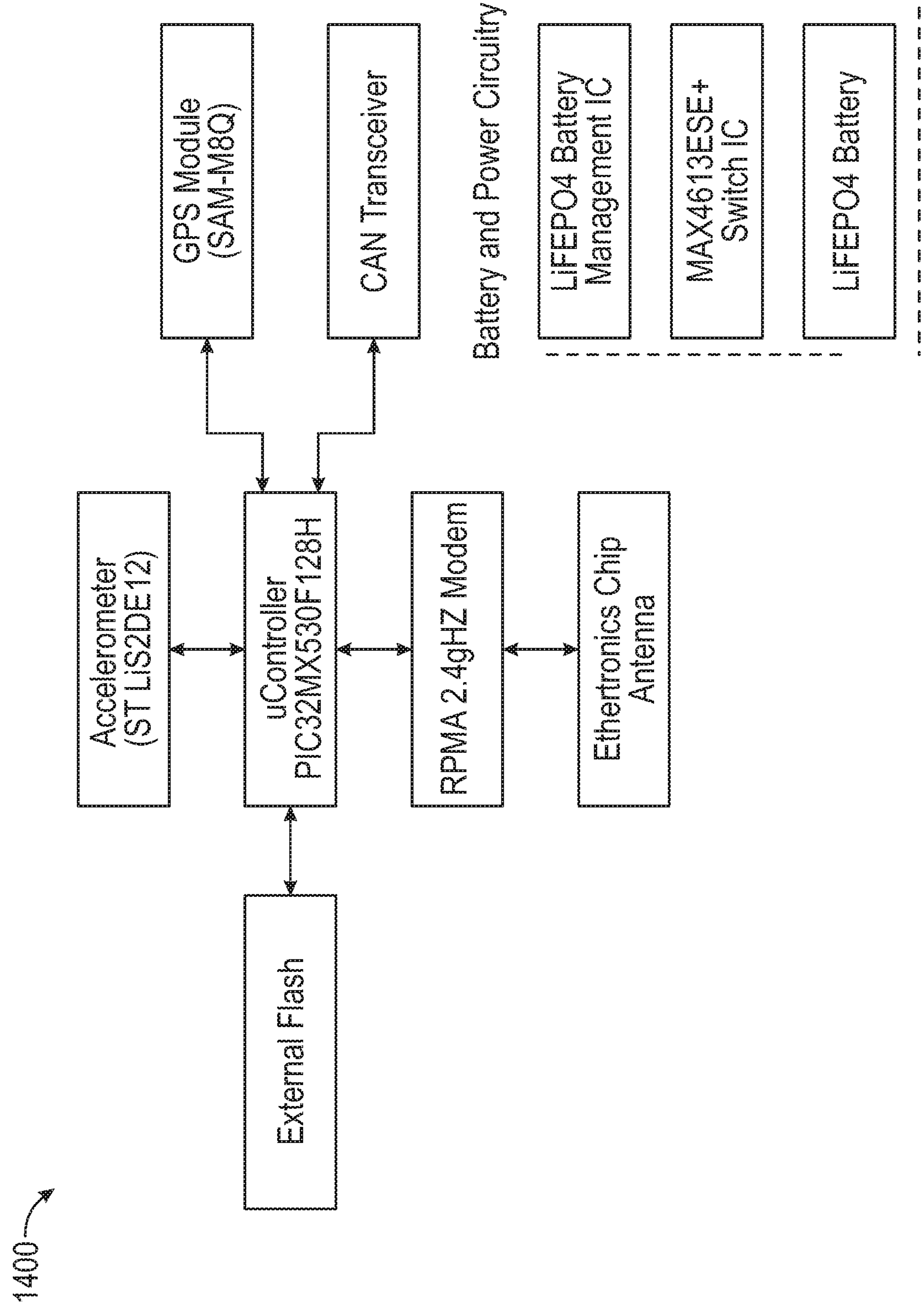
FIG. 14 is an example block diagram for hardware components of a remote asset detection system in accordance with one or more embodiments of the disclosure.

FIG. 14 is an example block diagram 1400 for hardware components of a remote asset detection system in accordance with one or more embodiments of the disclosure.

Figure 15:
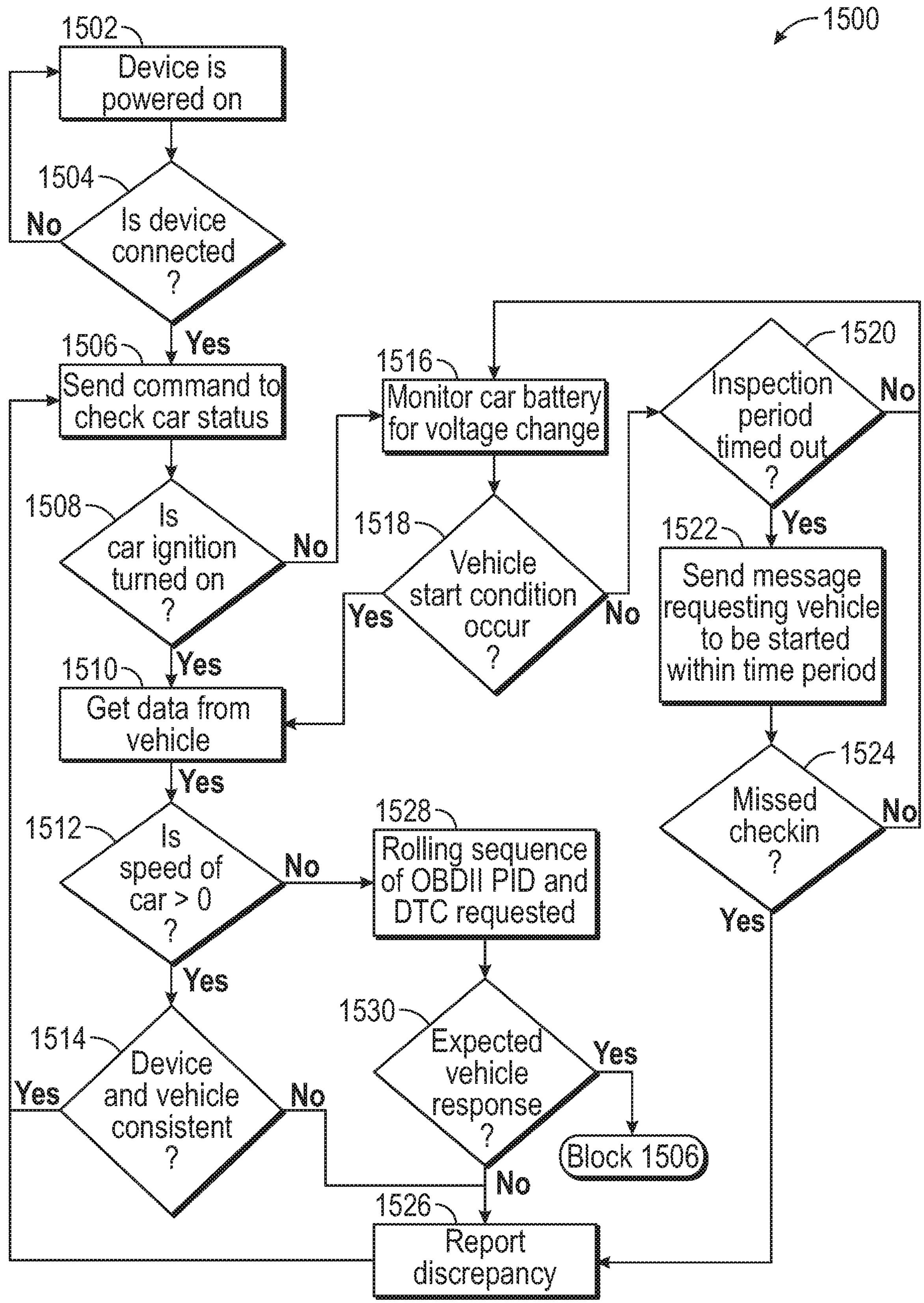
FIG. 15 is a process flow diagram for a remote asset detection system in accordance with one or more embodiments of the disclosure.

FIG. 15 is a process flow diagram 1500 for a remote asset detection system in accordance with one or more embodiments of the disclosure. In some embodiments, the OBD security protocol state machine may assign a point value for each block depicted in FIG. 15. Multiple or successive discrepancies may trigger additional state machines that may determine vehicle validity states.

At block 1502, an OBD tool may be powered on. At block 1504, a determination may be made on whether the OBD tool is connected to the vehicle OBD port. If the OBD tool is not connected, the method may proceed back to block 1502. If at block 1504, the device is determined to be connected to the OBD port, then the method may proceed to block 1506. The OBD tool may send a command to check the vehicle status. At block 1508, a determination may be made on whether the car ignition is turned on or the engine of the vehicle is running. If the car ignition is turned on, the method may proceed to block 1510. The OBD tool may obtain data from the vehicle at block 1510. At block 1512, a determination is made on whether the speed of the car is greater than 0. If at block 1512, it is determined that the speed of the car is greater than zero, then the method may proceed to block 1514. At block 1514, a determination may be made on whether the data from the vehicle and the data from the OBD tool are consistent. For example, the OBD tool may be able to calculate the speed at which it is moving and compare the speed to the data obtained from the vehicle. If the data is consistent, then the method may proceed back to block 1506.

If at block 1514, it is determined that the data between the vehicle and the OBD tool is not consistent, then the method may proceed to block 1526. At block 1526, the discrepancy may be reported to the back-end or the platform of the remote asset detection system and the method may proceed back to block 1506.

If at block 1512, it is determined that the speed of the car is not greater than zero, then the method may proceed to block 1528. A rolling sequence of OBD II PID and DTC may be requested. At block 1530, a determination may be made on whether the vehicle response is aligned with expectations associated with the vehicle. If the expectations are aligned, the method may proceed back to block 1506. If the expectations are not aligned, the method may proceed to block 1526. At block 1526, the discrepancy may be reported to the back-end or the platform of the remote asset detection system and the method may proceed back to block 1506.

If at block 1508, it is determined that the car ignition is not turned on, the method may proceed to block 1516. The OBD tool may monitor the car battery for voltage changes. At block 1518, the OBD tool may determine whether a vehicle start condition has occurred. If yes, the method may proceed to block 1510. If a vehicle start condition has not occurred, the method may proceed to block 1520, where it may be determined whether a vehicle timed out for an inspection period. If the vehicle has not timed out, the method may proceed back to block 1516. If the vehicle has timed out, then the method may proceed to block 1522. At block 1522, a message may be sent requesting the vehicle be started within a time period as a check-in. At block 1524, a determination may be made on whether the check-in (e.g., vehicle was started within the specified time period) was missed. If the check-in was not missed, the method may proceed back to block 1516. If the check-in was missed, then at block 1526, the discrepancy may be reported to the back-end or the platform of the remote asset detection system and the method may proceed back to block 1506.

One or more operations of the methods, process flows, or use cases of FIGS. 1-15 may have been described above as being performed by a user device, or more specifically, by one or more program module(s), applications, or the like executing on a device. It should be appreciated, however, that any of the operations of the methods, process flows, or use cases of FIGS. 1-15 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-15 may be described in the context of the illustrative devices, it should be appreciated that such operations may be implemented in connection with numerous other device configurations.

The operations described and depicted in the illustrative methods, process flows, and use cases of FIGS. 1-15 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-15 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 16:
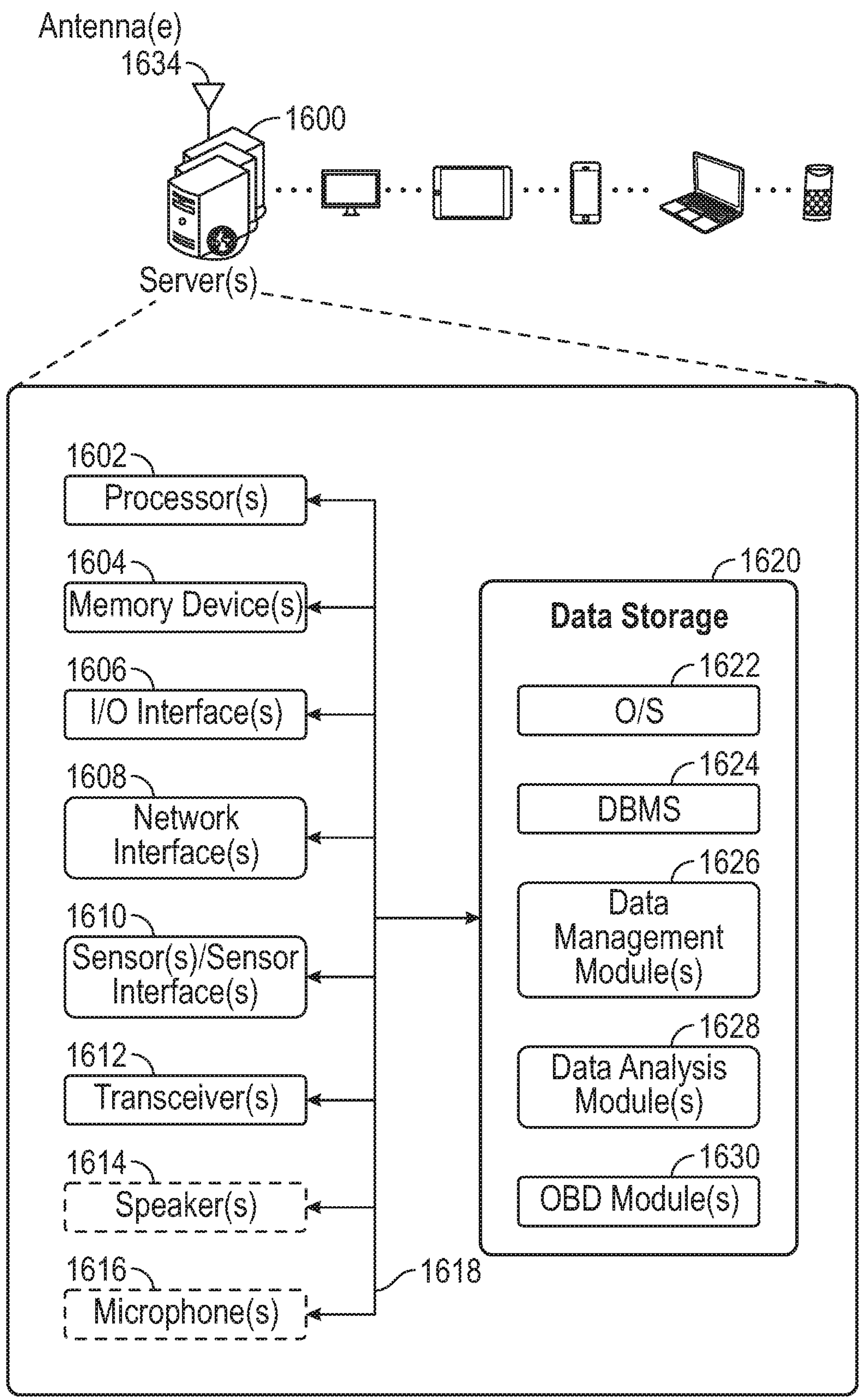
FIG. 16 is an example diagram that schematically illustrates an example architecture of a server of the remote asset detection system in accordance with one or more embodiments of the disclosure.

FIG. 16 is a schematic block diagram of one or more illustrative server(s) 1600 in accordance with one or more example embodiments of the disclosure. The server(s) 1600 may include any suitable computing device including, but not limited to, a server system, a mobile device such as a smartphone, a tablet, an e-reader, a wearable device, or the like; a desktop computer; a laptop computer; a content streaming device; a set-top box; or the like. The server(s) 1600 may correspond to an illustrative device configuration for the content selection servers of FIGS. 1-15.

The server(s) 1600 may be configured to communicate via one or more networks with one or more servers, user devices, or the like. The server(s) 1600 may be configured to receive data from one or more on-board diagnostic tools, analyze the data, provide the data via an interface to one or more entities, and/or generate alerts based on the data and predetermined rules.

The server(s) 1600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server(s) 1600 may include one or more processors (processor(s)) 1602, one or more memory devices 1604 (generically referred to herein as memory 1604), one or more input/output (I/O) interfaces 1606, one or more network interfaces 1608, one or more sensors or sensor interfaces 1610, one or more transceivers 1612, one or more optional speakers 1614, one or more optional microphones 1616, and data storage 1620. The server(s) 1600 may further include one or more buses 1618 that functionally couple various components of the server(s) 1600. The server(s) 1600 may further include one or more antenna(e) 1634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1618 may include at least one of a system bus, a memory bus, an address bus, or a message bus, and may permit the exchange of information (e.g., data (including computer-executable code), signaling, etc.) between various components of the server(s) 1600. The bus(es) 1618 may include, without limitation, a memory bus or a memory controller, a peripheral bus, an accelerated graphics port, and so forth. The bus(es) 1618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1604 of the server(s) 1600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1620 may include removable storage and/or non-removable storage including, but not limited to, magnetic storage, optical disk storage, and/or tape storage. The data storage 1620 may provide non-volatile storage of computer-executable instructions and other data. The memory 1604 and the data storage 1620, removable and/or non-removable, are examples of computer-readable storage media (CRSM) as that term is used herein.

The data storage 1620 may store computer-executable code, instructions, or the like that may be loadable into the memory 1604 and executable by the processor(s) 1602 to cause the processor(s) 1602 to perform or initiate various operations. The data storage 1620 may additionally store data that may be copied to the memory 1604 for use by the processor(s) 1602 during the execution of the computer-executable instructions. Moreover, output data generated as a result of execution of the computer-executable instructions by the processor(s) 1602 may be stored initially in the memory 1604, and may ultimately be copied to the data storage 1620 for non-volatile storage.

More specifically, the data storage 1620 may store one or more operating systems (O/S) 1622; one or more database management systems (DBMSs) 1624; and one or more program module(s), applications, engines, computer-executable code, scripts, or the like such as, for example, one or more data management module(s) 1626, one or more data analysis module(s) 1628, and/or one or more OBD module(s) 1630. Some or all of these module(s) may be sub-module(s). Any of the components depicted as being stored in the data storage 1620 may include any combination of software, firmware, and/or hardware. The software and/or firmware may include computer-executable code, instructions, or the like that may be loaded into the memory 1604 for execution by one or more of the processor(s) 1602. Any of the components depicted as being stored in the data storage 1620 may support functionality described in reference to corresponding components named earlier in this disclosure.

The data storage 1620 may further store various types of data utilized by the components of the server(s) 1600. Any data stored in the data storage 1620 may be loaded into the memory 1604 for use by the processor(s) 1602 in executing computer-executable code. In addition, any data depicted as being stored in the data storage 1620 may potentially be stored in one or more datastore(s) and may be accessed via the DBMS 1624 and loaded in the memory 1604 for use by the processor(s) 1602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 16, an example datastore(s) may include, for example, web content, advertisement campaigns, advertisements, content items, and/or other information.

The processor(s) 1602 may be configured to access the memory 1604 and execute the computer-executable instructions loaded therein. For example, the processor(s) 1602 may be configured to execute the computer-executable instructions of the various program module(s), applications, engines, or the like of the server(s) 1600 to cause or facilitate various operations to be performed in accordance with one or more embodiments of the disclosure. The processor(s) 1602 may include any suitable processing unit capable of accepting data as input, processing the input data in accordance with stored computer-executable instructions, and generating output data. The processor(s) 1602 may include any type of suitable processing unit including, but not limited to, a central processing unit, a microprocessor, a reduced instruction set computer (RISC) microprocessor, a complex instruction set computer (CISC) microprocessor, a microcontroller, an application specific integrated circuit (ASIC), a field-programmable gate array (FPGA), a system-on-a-chip (SoC), a digital signal processor (DSP), and so forth. Further, the processor(s) 1602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1602 may be capable of supporting any of a variety of instruction sets.

Referring now to functionality supported by the various program module(s) depicted in FIG. 16, the data management module(s) 1626 may include computer-executable instructions, code, or the like that responsive to execution by one or more of the processor(s) 1602 may perform functions including, but not limited to, receiving and transmitting data to OBD tools, asset management personnel, management entities, financial entities, and the like.

The data analysis module(s) 1628 may include computer-executable instructions, code, or the like that responsive to execution by one or more of the processor(s) 1602 may perform functions including, but not limited to, translating and analyzing data received from OBD tools and other sources. The data may be analyzed using machine-learning techniques and other data analysis mechanisms that may provide insight into the data obtained from the OBD tools.

The OBD module(s) 1630 may include computer-executable instructions, code, or the like that responsive to execution by one or more of the processor(s) 1602 may perform functions including, but not limited to, communicating with OBD tools, transmitting instructions, and managing firmware updates for the OBD tools.

Referring now to other illustrative components depicted as being stored in the data storage 1620, the O/S 1622 may be loaded from the data storage 1620 into the memory 1604 and may provide an interface between other application software executing on the server(s) 1600 and the hardware resources of the server(s) 1600. More specifically, the O/S 1622 may include a set of computer-executable instructions for managing hardware resources of the server(s) 1600 and for providing common services to other application programs (e.g., managing memory allocation among various application programs). In certain example embodiments, the O/S 1622 may control execution of the other program module(s) to dynamically enhance characters for content rendering. The O/S 1622 may include any operating system now known or which may be developed in the future including, but not limited to, any server operating system, any mainframe operating system, or any other proprietary or non-proprietary operating system.

The DBMS 1624 may be loaded into the memory 1604 and may support functionality for accessing, retrieving, storing, and/or manipulating data stored in the memory 1604 and/or data stored in the data storage 1620. The DBMS 1624 may use any of a variety of database models (e.g., relational model, object model, etc.) and may support any of a variety of query languages. The DBMS 1624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the server(s) 1600 is a mobile device, the DBMS 1624 may be any suitable lightweight DBMS optimized for performance on a mobile device.

Referring now to other illustrative components of the server(s) 1600, the input/output (I/O) interface(s) 1606 may facilitate the receipt of input information by the server(s) 1600 from one or more I/O devices as well as the output of information from the server(s) 1600 to one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server(s) 1600 or may be separate. The I/O devices may further include, for example, any number of peripheral devices such as data storage devices, printing devices, and so forth.

The I/O interface(s) 1606 may also include an interface for an external peripheral device connection such as a universal serial bus (USB), FireWire, Thunderbolt, Ethernet port or other connection protocol that may connect to one or more networks. The I/O interface(s) 1606 may also include a connection to one or more of the antenna(e) 1634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The server(s) 1600 may further include one or more network interface(s) 1608 via which the server(s) 1600 may communicate with any of a variety of other systems, platforms, networks, devices, and so forth. The network interface(s) 1608 may enable communication, for example, with one or more wireless routers, one or more host servers, one or more web servers, and the like via one or more networks.

The antenna(e) 1634 may include any suitable type of antenna depending, for example, on the communications protocols used to transmit or receive signals via the antenna(e) 1634. Non-limiting examples of suitable antennae may include directional antennae, non-directional antennae, dipole antennae, folded dipole antennae, patch antennae, multiple-input multiple-output (MIMO) antennae, or the like. The antenna(e) 1634 may be communicatively coupled to one or more transceivers 1612 or radio components to which or from which signals may be transmitted or received.

As previously described, the antenna(e) 1634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1634 may be configured to transmit or receive radio frequency signals within any suitable frequency range forming part of the unlicensed portion of the radio spectrum.

The antenna(e) 1634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1612 may include any suitable radio component(s) for—in cooperation with the antenna(e) 1634—transmitting or receiving radio frequency (RF) signals in the bandwidth and/or channels corresponding to the communications protocols utilized by the server(s) 1600 to communicate with other devices. The transceiver(s) 1612 may include hardware, software, and/or firmware for modulating, transmitting, or receiving—potentially in cooperation with any of antenna(e) 1634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1612 may further include hardware, firmware, or software for receiving GNSS signals. The transceiver(s) 1612 may include any known receiver and baseband suitable for communicating via the communications protocols utilized by the server(s) 1600. The transceiver(s) 1612 may further include a low noise amplifier (LNA), additional signal amplifiers, an analog-to-digital (A/D) converter, one or more buffers, a digital baseband, or the like.

The sensor(s)/sensor interface(s) 1610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 1614 may be any device configured to generate audible sound. The microphone(s) 1616 may be any device configured to receive analog sound input or voice data.

It should be appreciated that the program module(s), applications, computer-executable instructions, code, or the like depicted in FIG. 16 as being stored in the data storage 1620 are merely illustrative and not exhaustive and that processing described as being supported by any particular module may alternatively be distributed across multiple module(s) or performed by a different module. In addition, various program module(s), script(s), plug-in(s), application programming interface(s) (API(s)), or any other suitable computer-executable code hosted locally on the server(s) 1600, and/or hosted on other computing device(s) accessible via one or more networks, may be provided to support functionality provided by the program module(s), applications, or computer-executable code depicted in FIG. 16 and/or additional or alternate functionality. Further, functionality may be modularized differently such that processing described as being supported collectively by the collection of program module(s) depicted in FIG. 16 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 16 may be implemented, at least partially, in hardware and/or firmware across any number of devices.

It should further be appreciated that the server(s) 1600 may include alternate and/or additional hardware, software, or firmware components beyond those described or depicted without departing from the scope of the disclosure. More particularly, it should be appreciated that software, firmware, or hardware components depicted as forming part of the server(s) 1600 are merely illustrative and that some components may not be present or additional components may be provided in various embodiments. While various illustrative program module(s) have been depicted and described as software module(s) stored in the data storage 1620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-15 may be performed by a device having the illustrative configuration depicted in FIG. 16, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-15 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-15 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A system for verification of a remote asset, the system comprising:

an on-board diagnostic tool configured to be coupled to an on-board diagnostic port of the remote asset, wherein the remote asset is a vehicle, and wherein the on-board diagnostic tool is configured to:

monitor one or more parameters of the remote asset, wherein the on-board diagnostic tool comprises a locking mechanism for locking the on-board diagnostic tool to the on-board diagnostic port of the remote asset, wherein the on-board diagnostic tool is further configured to provide an indication that the on-board diagnostic tool has been removed from a diagnostic port of the vehicle subsequent to being locked into the on-board diagnostic port of the vehicle using the locking mechanism, wherein the on-board diagnostic tool includes a pass-through port that is housed separately from a connector, wherein the connector connects the on-board diagnostic tool to the on-board diagnostic port of the vehicle, and wherein the connector and pass-through port are connected by a tether.

2. The system of claim 1, wherein the on-board diagnostic tool comprises a backup battery, a GPS, an antenna, and an accelerometer.

3. The system of claim 2, wherein the pass-through port is configured to enable personnel to connect an on-board diagnostic reader while limiting access of the on-board diagnostic reader to certain types of data.

4. The system of claim 2, wherein the backup battery is configured to enable the on-board diagnostic tool to function even if it is not connected to a power source of the remote asset or if the remote asset is off.

5. The system of claim 4, wherein the on-board diagnostic tool is configured to send periodic messages to an administrator of the system, which may indicate a location of the on-board diagnostic tool and/or the remote asset.

6. The system of claim 1, wherein the remote asset comprises a plurality of assets each having the on-board diagnostic tool.

7. The system of claim 1, wherein the connector is a vehicle-mounted receptacle that is coupled to the on-board diagnostic port of the remote asset, wherein the pass-through port is configured to couple to the vehicle-mounted receptacle using one or more latches configured to engage with a feature within the vehicle-mounted receptacle.

8. The system of claim 7, wherein the vehicle-mounted receptacle includes one or more protrusions, wherein the one or more latches are configured to engage with the one or more protrusions, and wherein the one or more latches are configured to be movable using a spring-loaded component, and wherein the one or more latches are configured to be movable using a key that is inserted into the pass-through port.

9. The system of claim 1, wherein the on-board diagnostic tool is further configured to:

determine that an ignition of the vehicle is off;

receive a check-in request to the vehicle, the check-in request including a request to start the vehicle within a time period;

determine that the vehicle has not been started within the time period; and send an indication that the vehicle has not been started within the time period.

10. The system of claim 9, wherein the indication is communicated to a user interface of a user device, wherein the user interface includes a map displaying locations of one or more additional vehicles associated with one or more additional on-board diagnostic tools, data associated with the one or more additional vehicles provided by the one or more additional on-board diagnostic tools.

11. The system of claim 10, wherein the user interface also includes at least one of: an indication on the map that the on-board diagnostic tool has been removed from a diagnostic port of the vehicle subsequent to being locked into the on-board diagnostic port of the vehicle using a locking mechanism or an indication on the map that the vehicle has traversed outside of a given location.

12. A method for verification of a remote asset, the method comprising:

associating an on-board diagnostic tool to an on-board diagnostic port of an asset, wherein the asset is a vehicle; and monitoring one or more parameters of the remote asset using the on-board diagnostic tool, wherein the on-board diagnostic tool comprises a locking mechanism for locking the on-board diagnostic tool to the on-board diagnostic port of the remote asset, wherein the on-board diagnostic tool is further configured to provide an indication that the on-board diagnostic tool has been removed from a diagnostic port of the vehicle subsequent to being locked into the on-board diagnostic port of the vehicle using the locking mechanism, wherein the on-board diagnostic tool includes a pass-through port that is housed separately from a connector, wherein the connector is a vehicle-mounted receptacle that is coupled to the on-board diagnostic port of the remote asset, wherein the pass-through port is configured to couple to the vehicle-mounted receptacle using one or more latches configured to engage with a feature within the vehicle-mounted receptacle.

13. The method of claim 12, further comprising communicating the indication to a user interface of a user device.

14. The method of claim 12, wherein the on-board diagnostic tool comprises a locking mechanism for locking the on-board diagnostic tool to the on-board diagnostic port of the asset.

15. The method of claim 14, wherein the on-board diagnostic tool comprises a key configured to unlock the on-board diagnostic tool from the on-board diagnostic port of the asset.

16. The method of claim 12, wherein the on-board diagnostic tool comprises a backup battery, a GPS, an antenna, an accelerometer, and a pass-through port.

17. The method of claim 16, further comprising enabling personnel to connect an on-aboard diagnostic reader to the pass-through port.

18. The method of claim 17, further comprising limiting access to certain types of data by an administrator.

19. The method of claim 12, further comprising operating the on-board diagnostic tool even if it is not connected to a power source of the asset or if the asset is off.

20. An on-board diagnostic tool configured to be coupled to an on-board diagnostic port of a remote asset, the on-board diagnostic tool comprising:

a locking mechanism for locking the on-board diagnostic tool to the on-board diagnostic port of the remote asset; and a pass-through port that is housed separately from a connector, wherein the connector connects the on-board diagnostic tool to the on-board diagnostic port of the remote asset, and wherein the connector is a vehicle-mounted receptacle that is coupled to the on-board diagnostic port of the remote asset, wherein the pass-through port is configured to couple to the vehicle-mounted receptacle using one or more latches configured to engage with a feature within the vehicle-mounted receptacle, and wherein the on-board diagnostic tool is further configured to provide an indication that the on-board diagnostic tool has been removed from a diagnostic port of the remote asset subsequent to being locked into the on-board diagnostic port of the remote asset using the locking mechanism.

* * * * *